J. R. ROGERS.
TYPOGRAPHICAL MACHINE.
APPLICATION FILED JULY 26, 1918.

1,382,549.

Patented June 21, 1921.

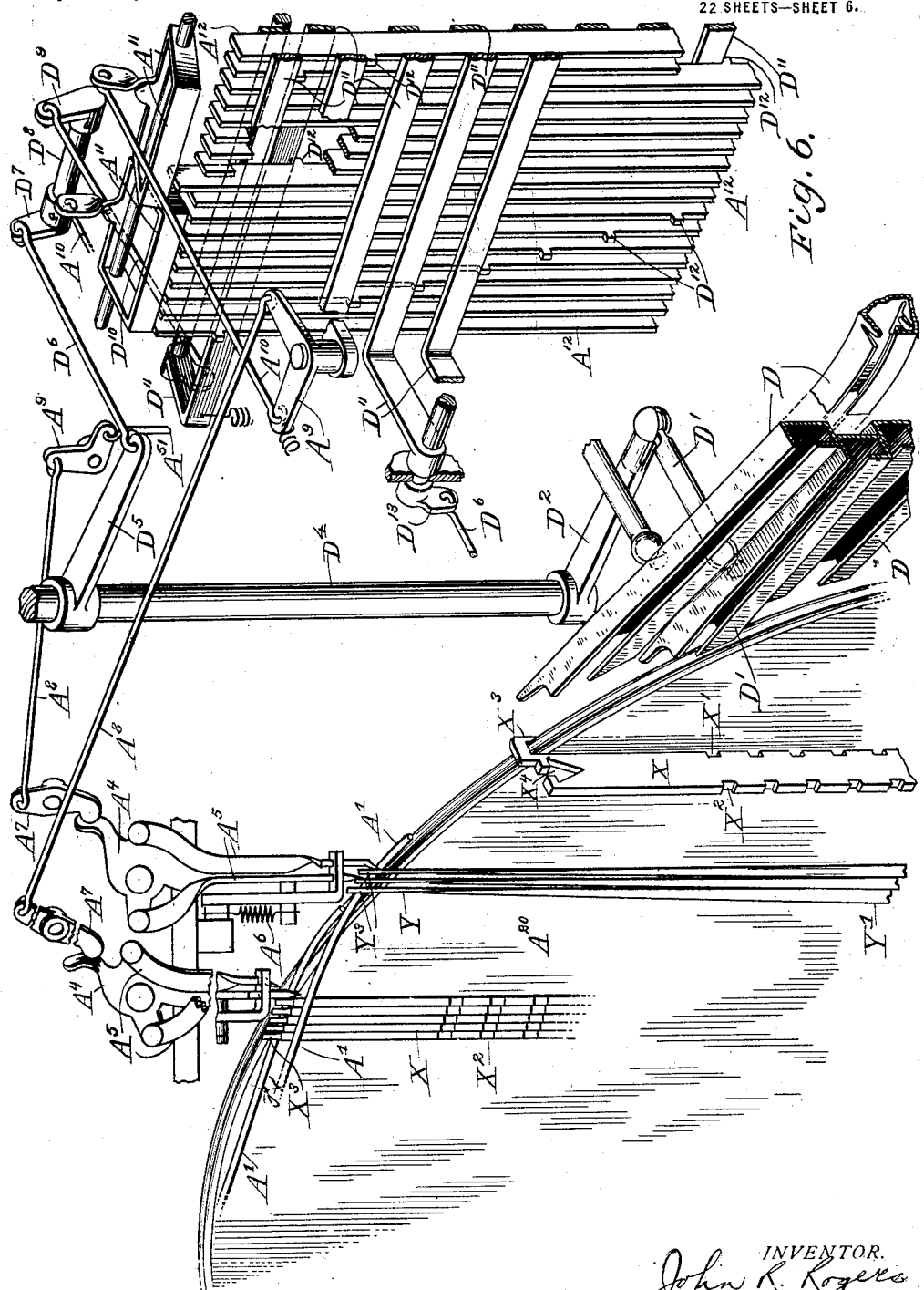

J. R. ROGERS.
TYPOGRAPHICAL MACHINE.
APPLICATION FILED JULY 26, 1918.
1,382,549.
Patented June 21, 1921.
22 SHEETS—SHEET 7.
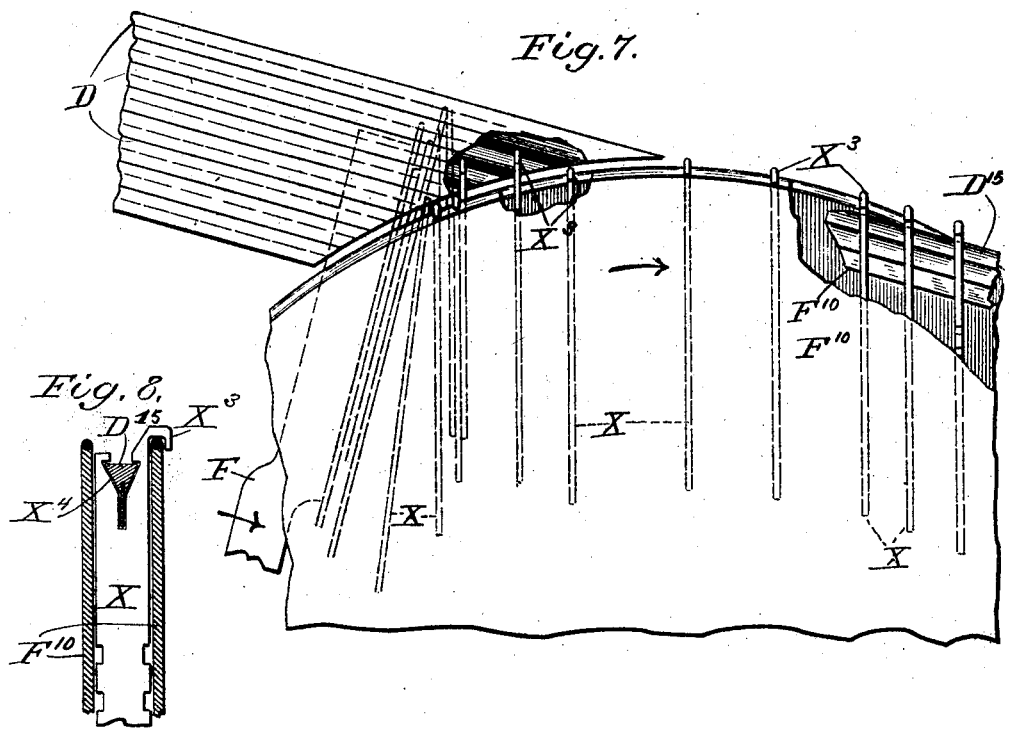
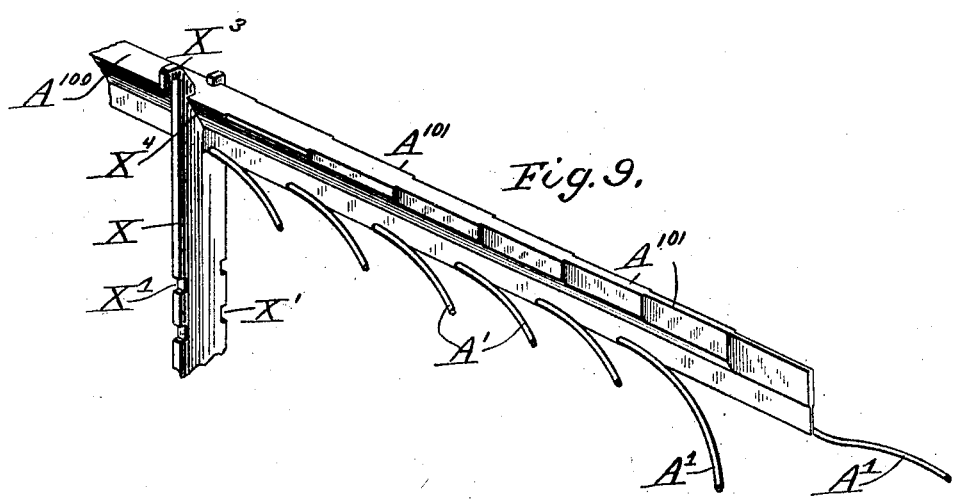
INVENTOR
John R. Rogers.
BY
Rogers, Kennedy & Campbell
ATTORNEYS

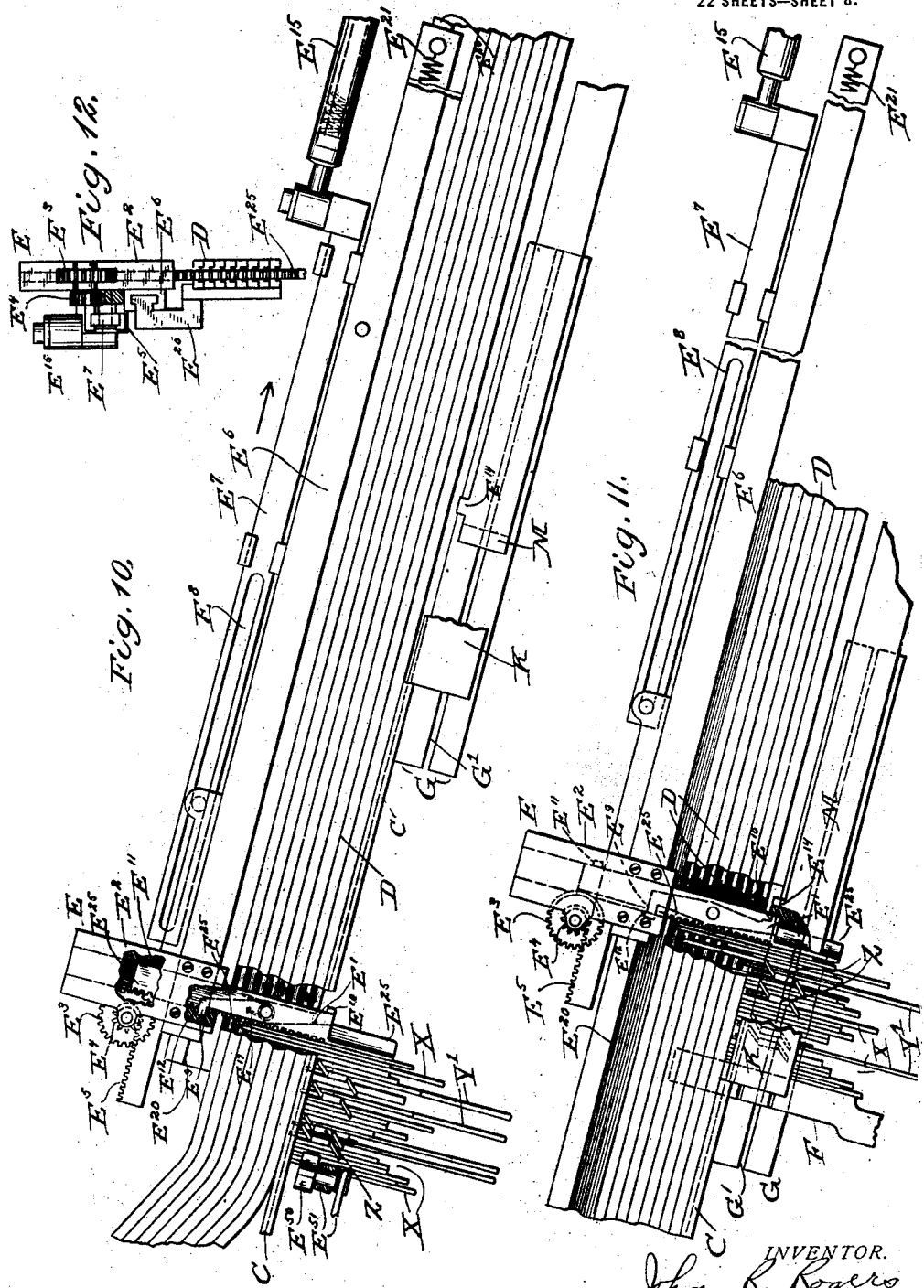

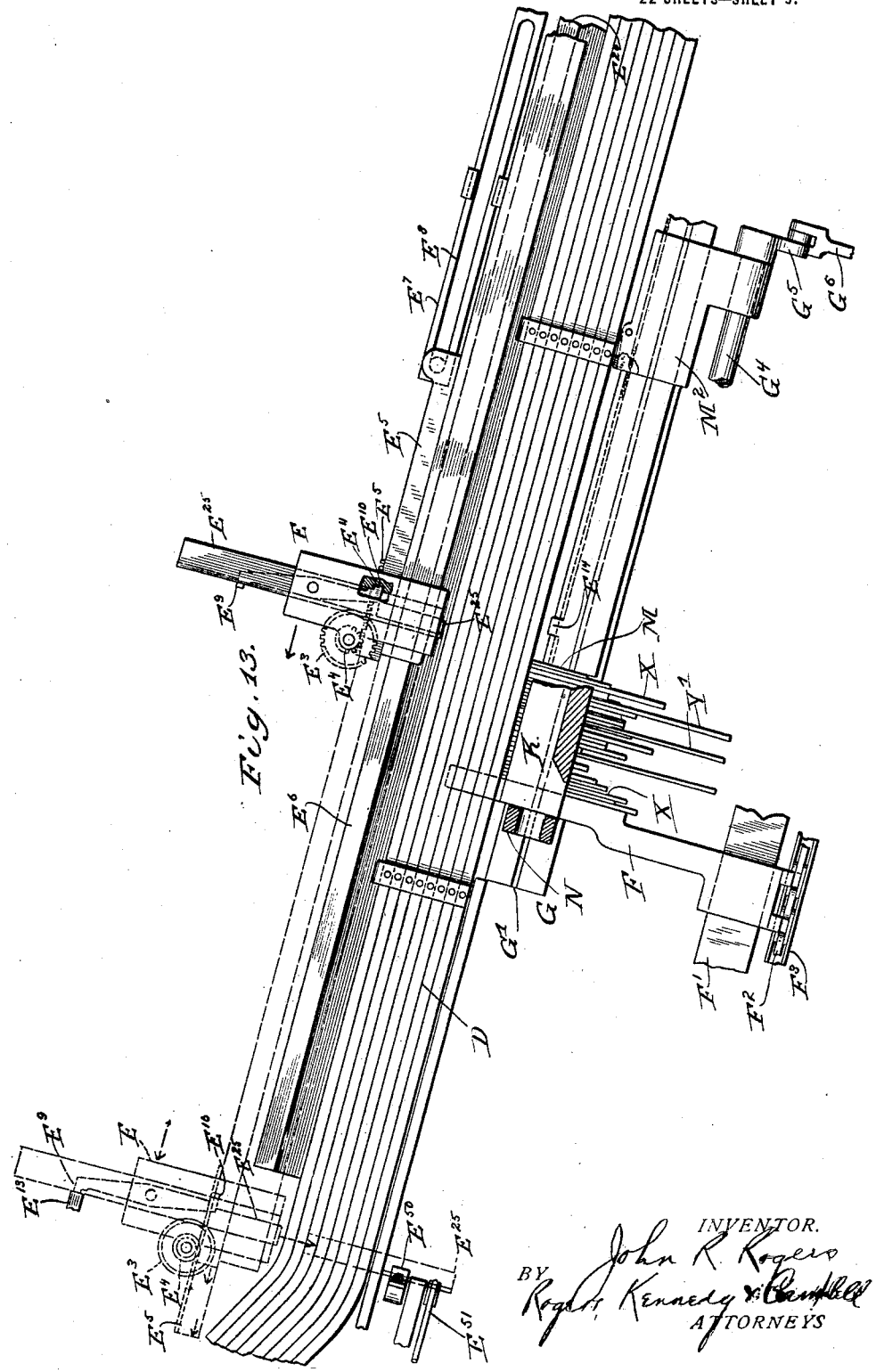

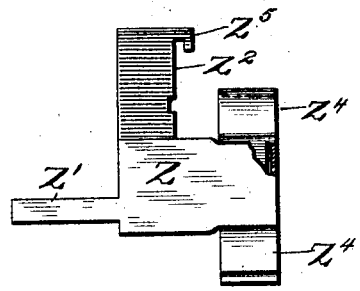
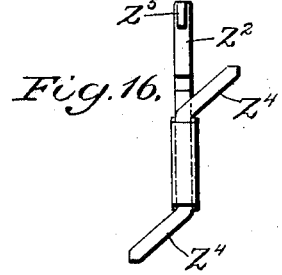
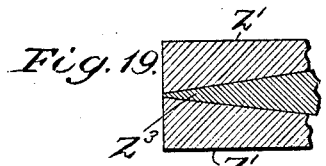
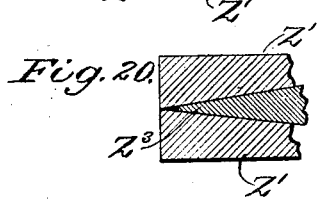
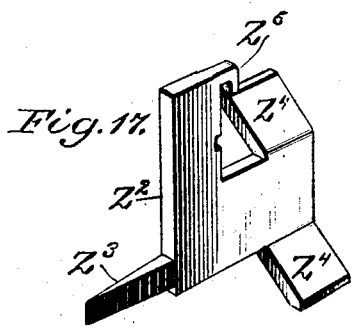
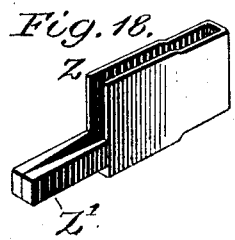

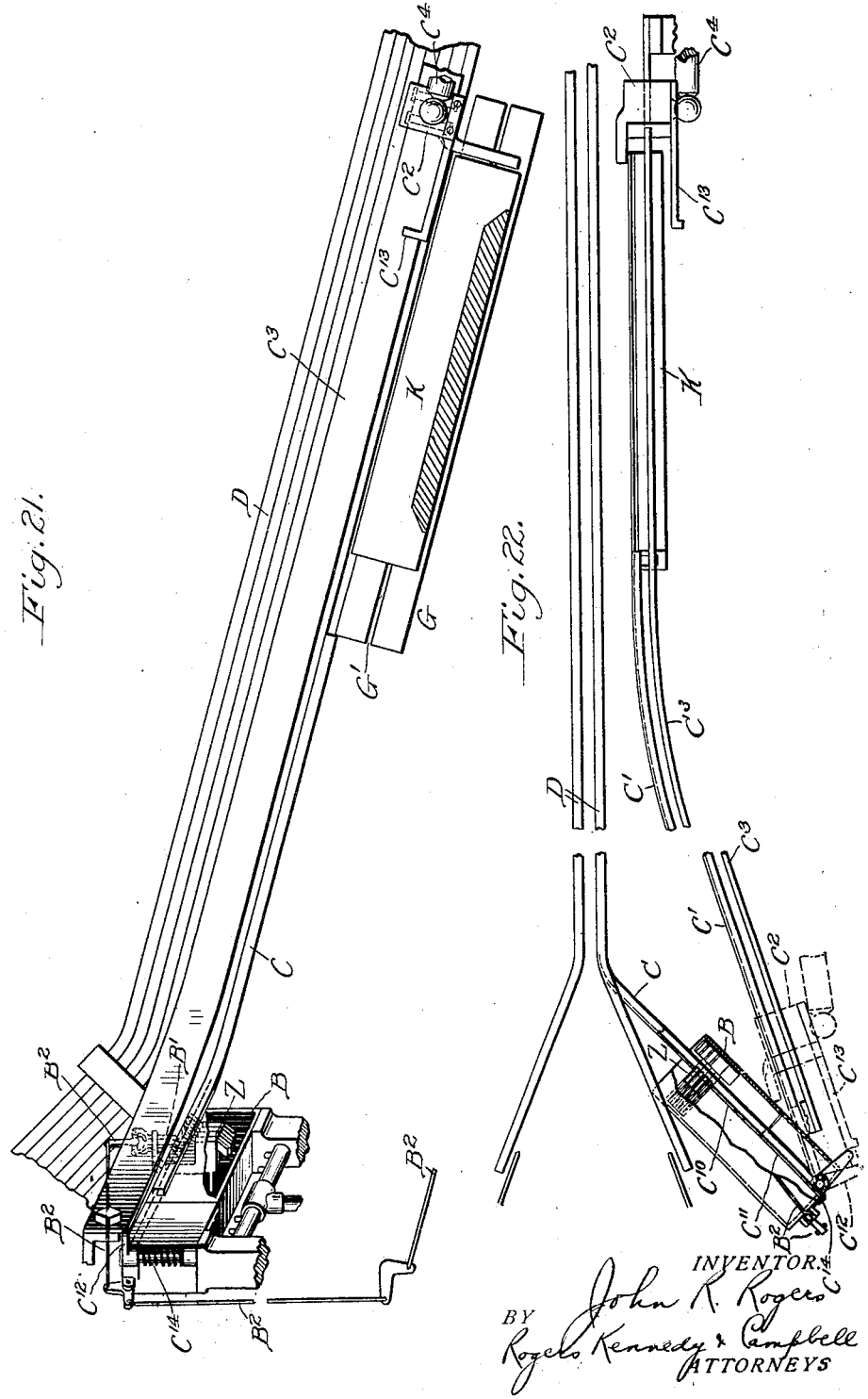

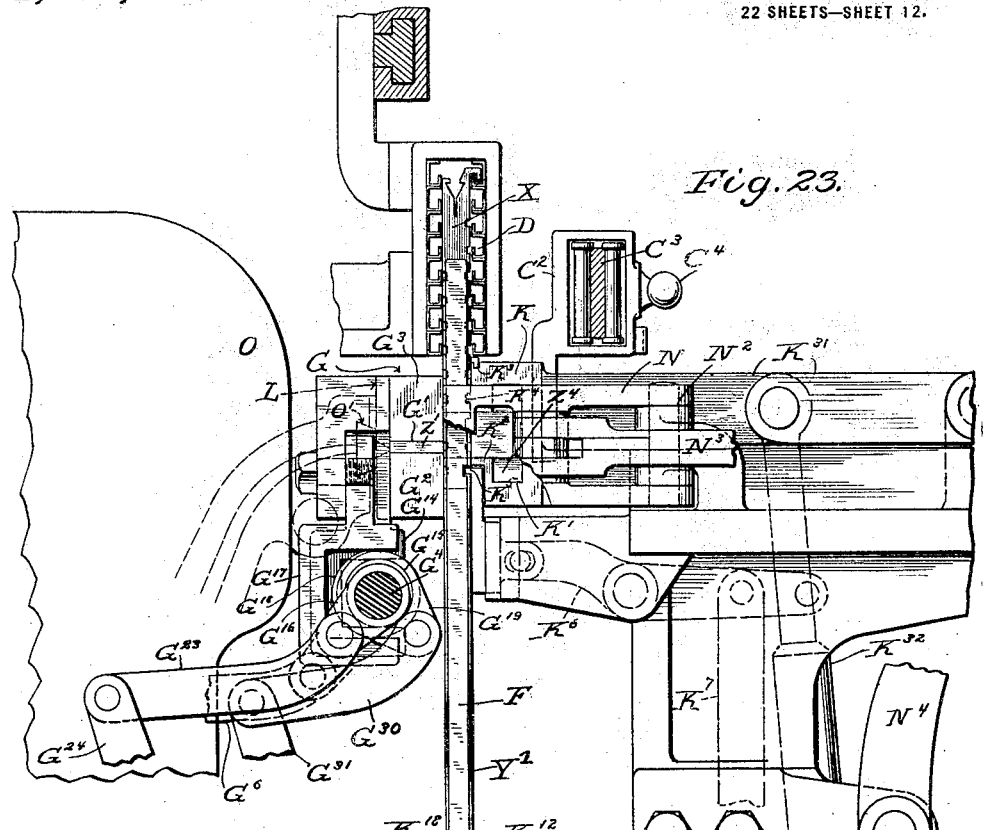
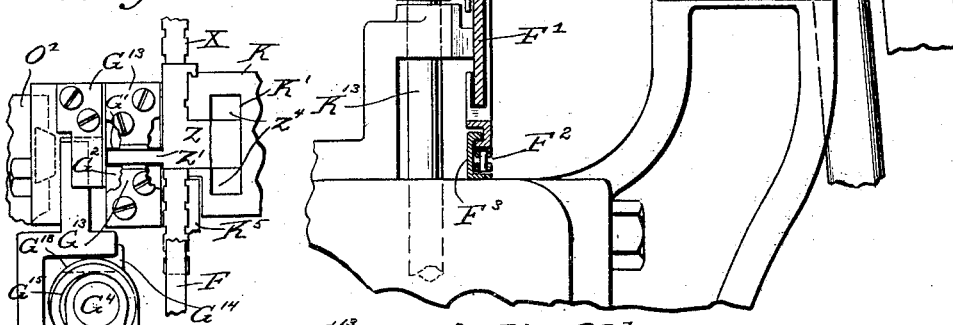
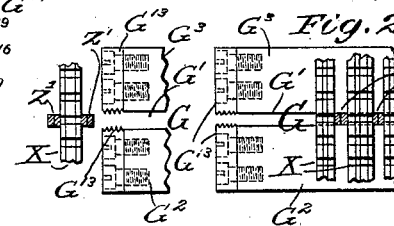

J. R. ROGERS.
TYPOGRAPHICAL MACHINE.
APPLICATION FILED JULY 26, 1918.
1,382,549.
Patented June 21, 1921.
22 SHEETS—SHEET 13.
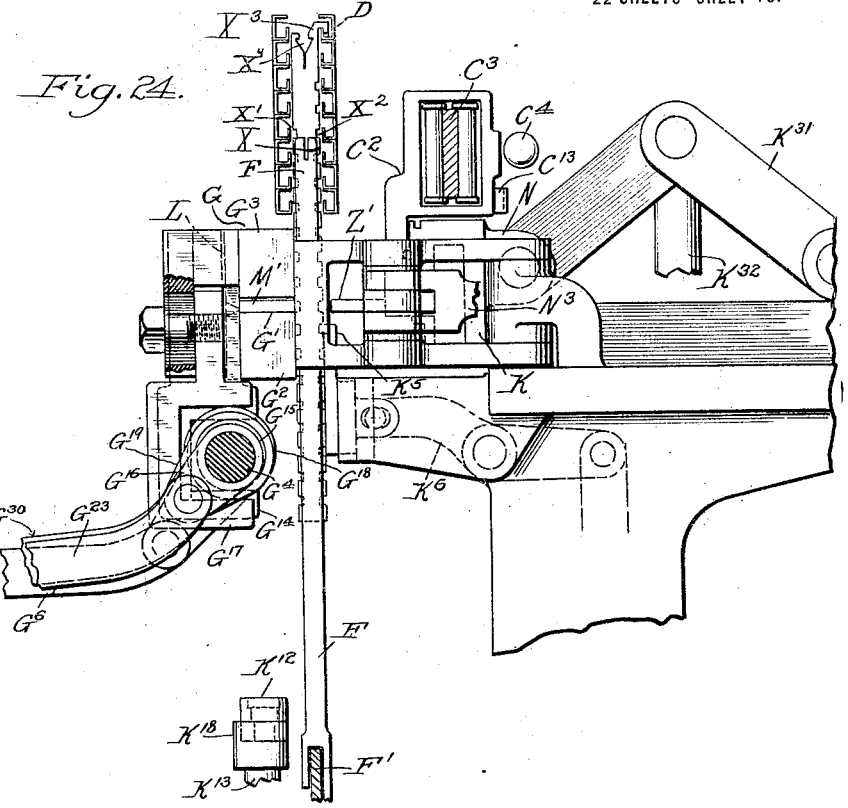
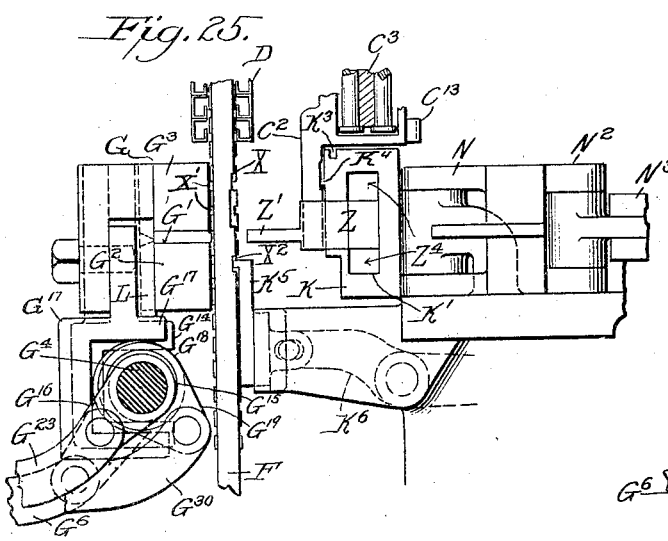
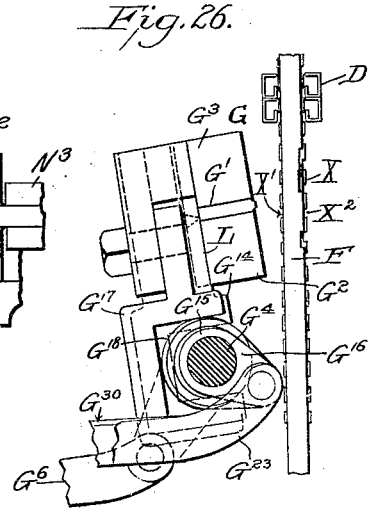
INVENTOR.
John R. Rogers
BY Rogers, Kennedy & Campbell
ATTORNEYS J. R. ROGERS.
TYPOGRAPHICAL MACHINE.
APPLICATION FILED JULY 26, 1918.
1,382,549.
Patented June 21, 1921.
22 SHEETS—SHEET 14.
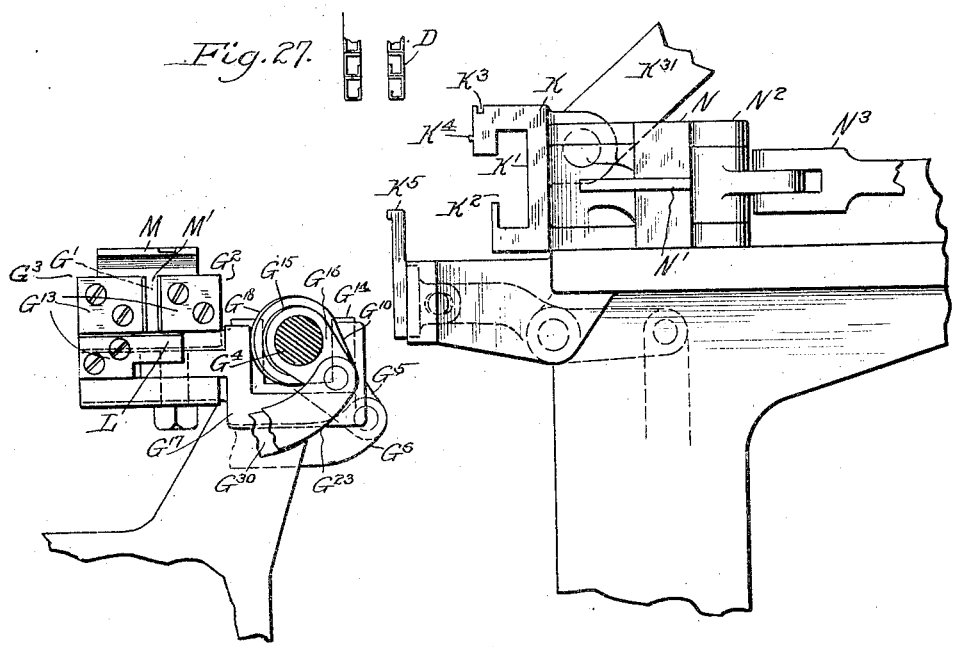
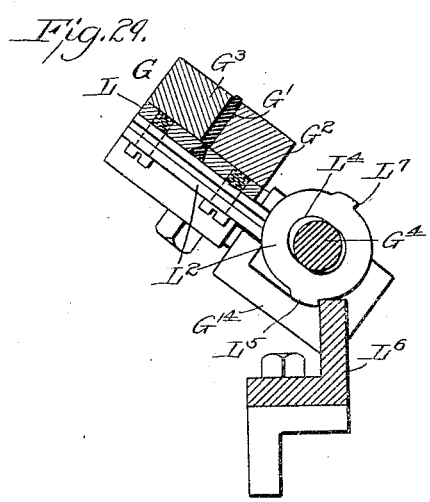
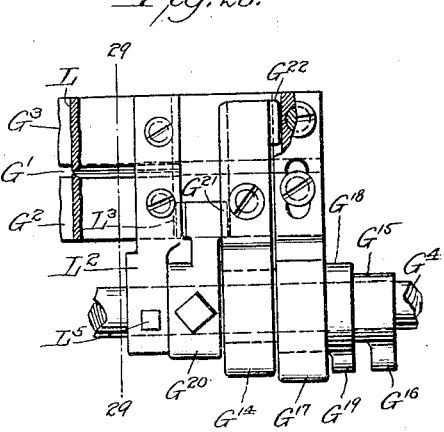
INVENTOR.
John R. Rogers
BY Rogers, Kennedy & Campbell
ATTORNEYS

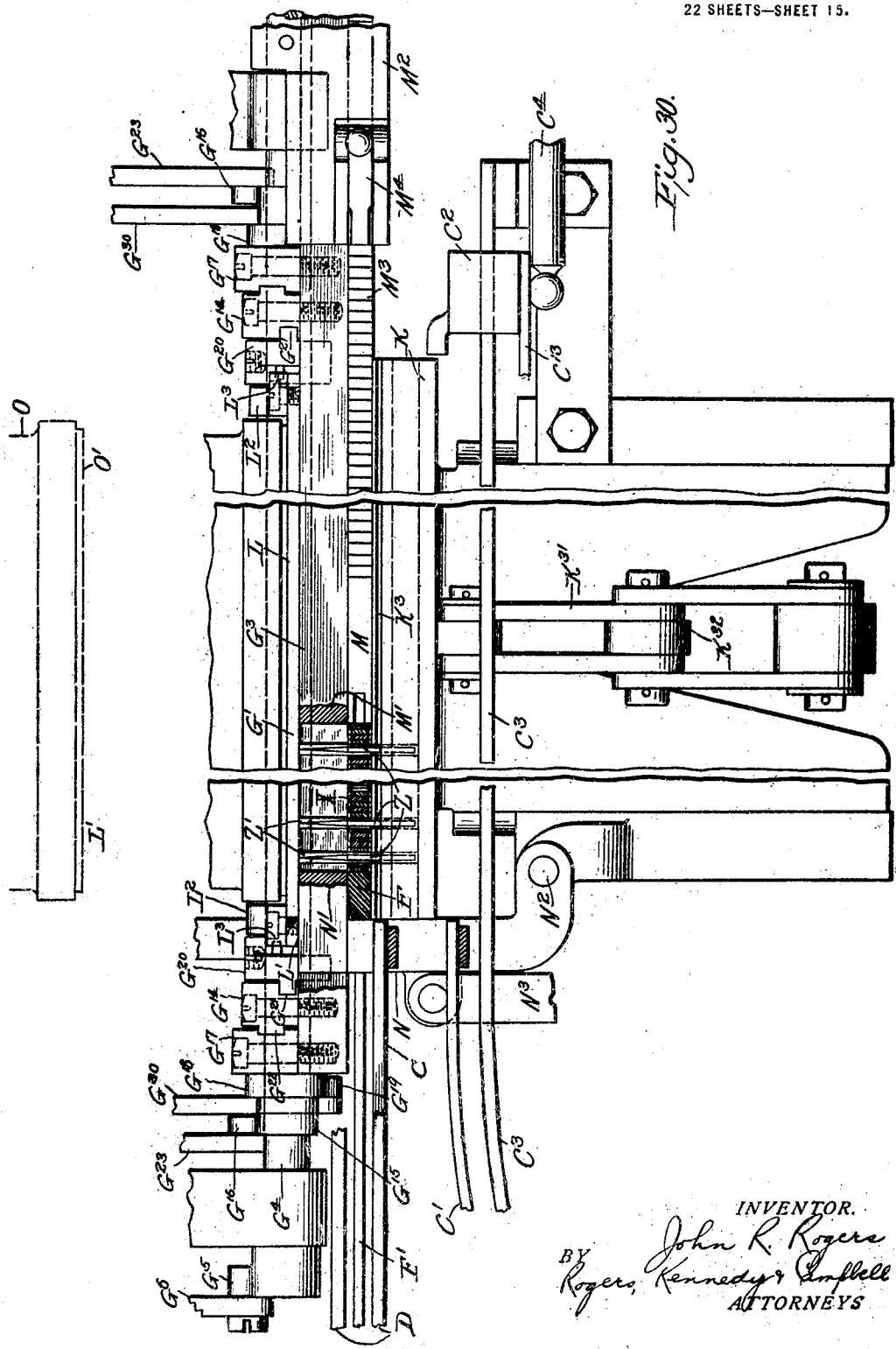

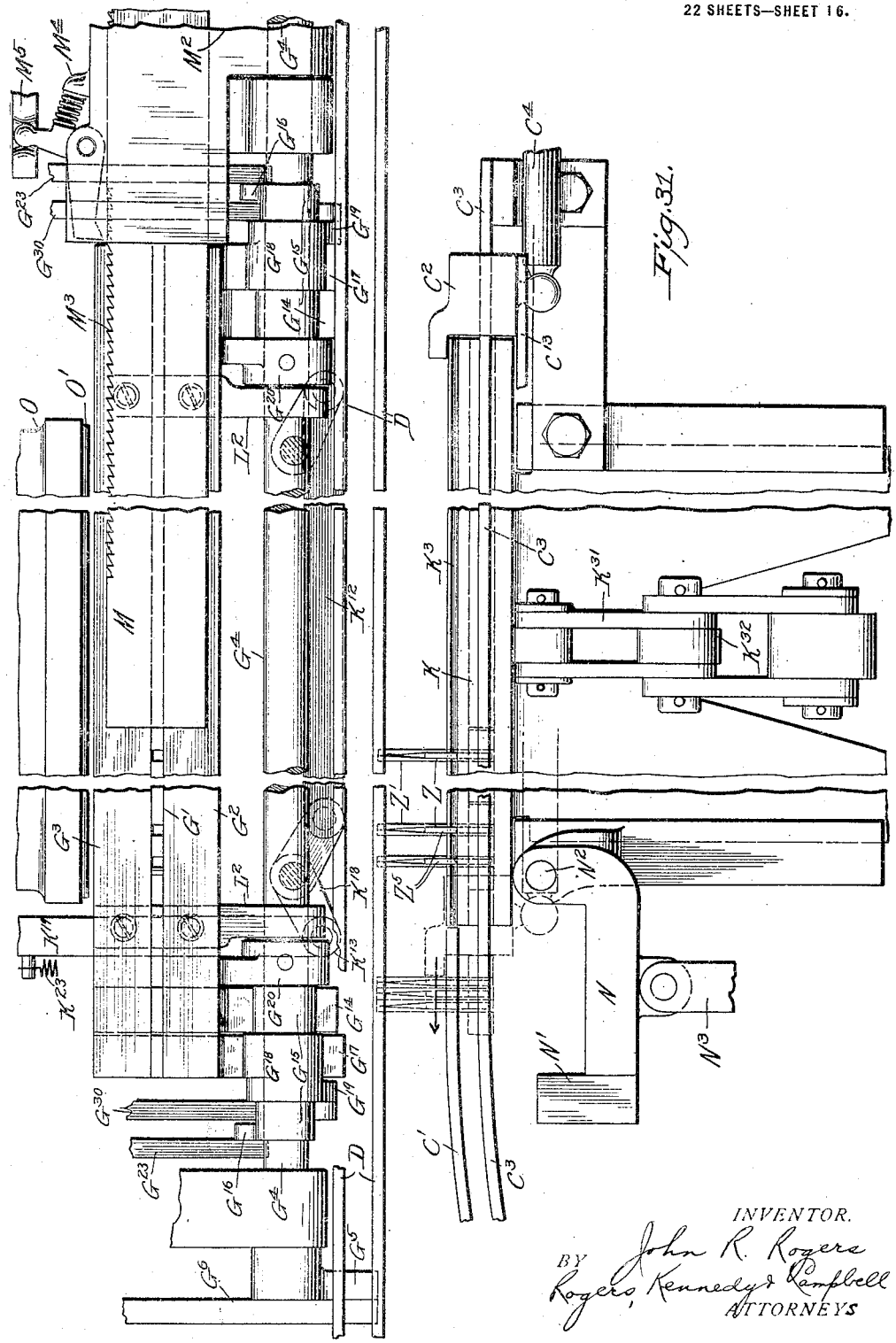

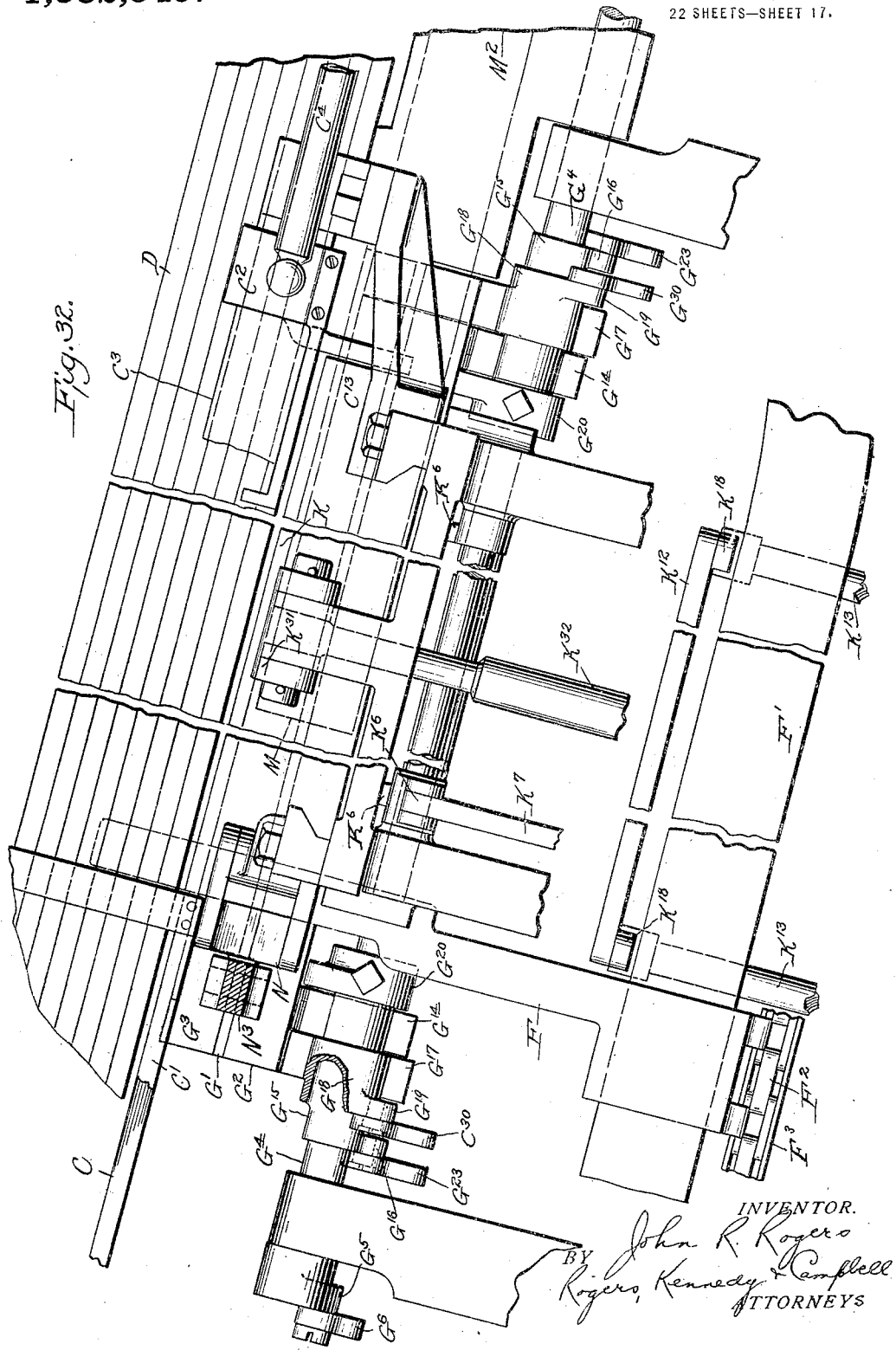

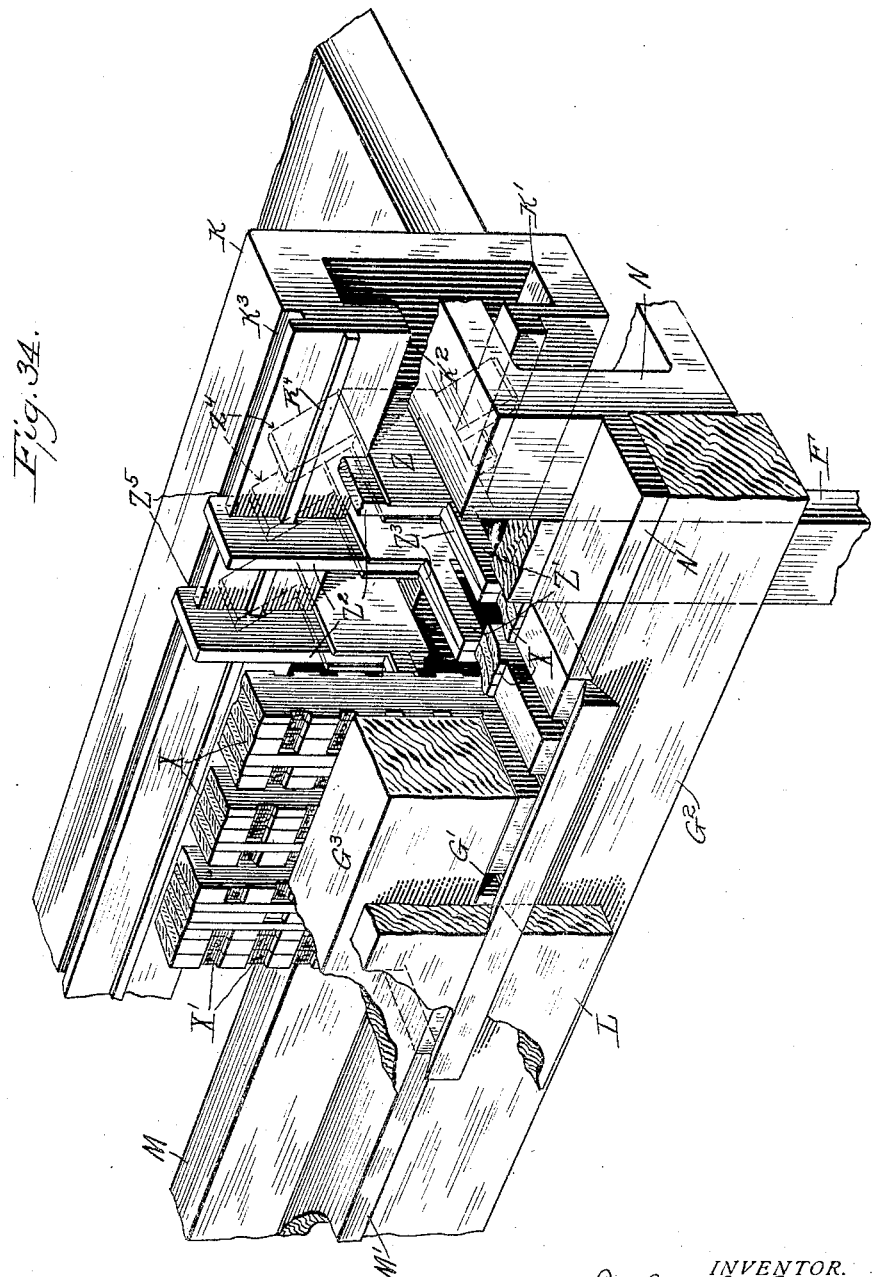

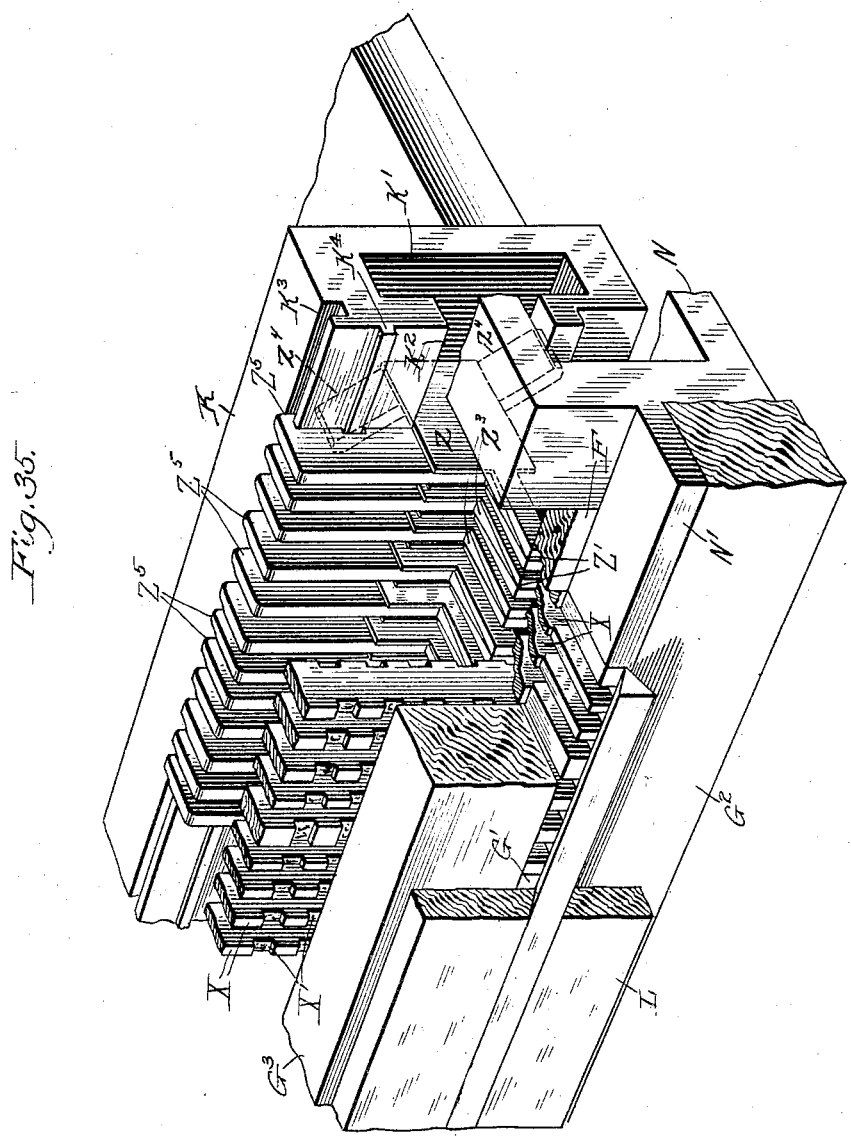

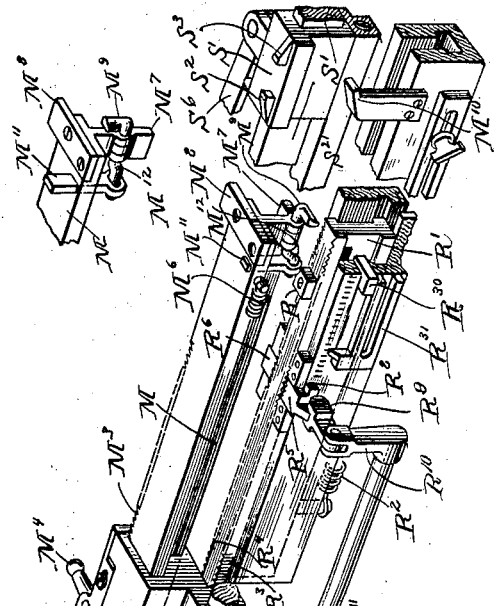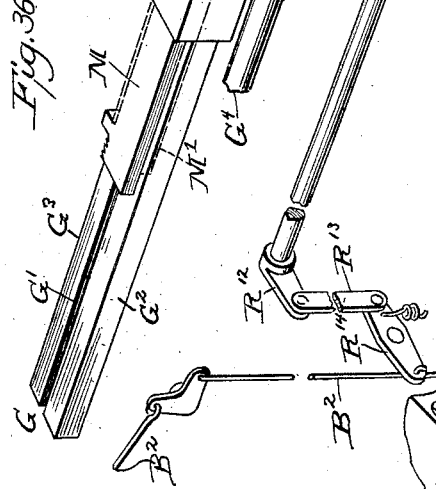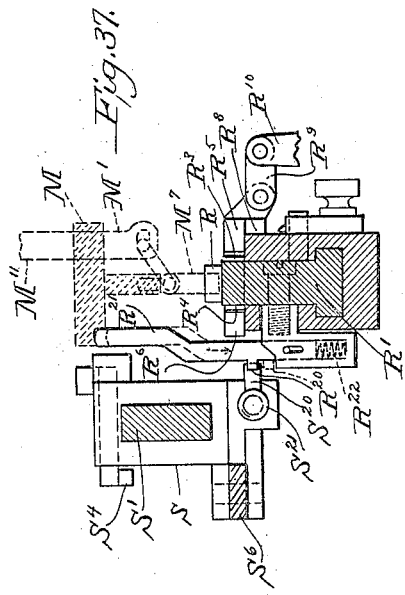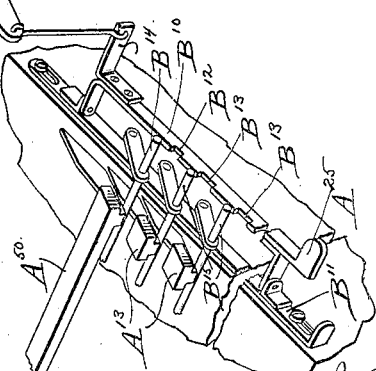

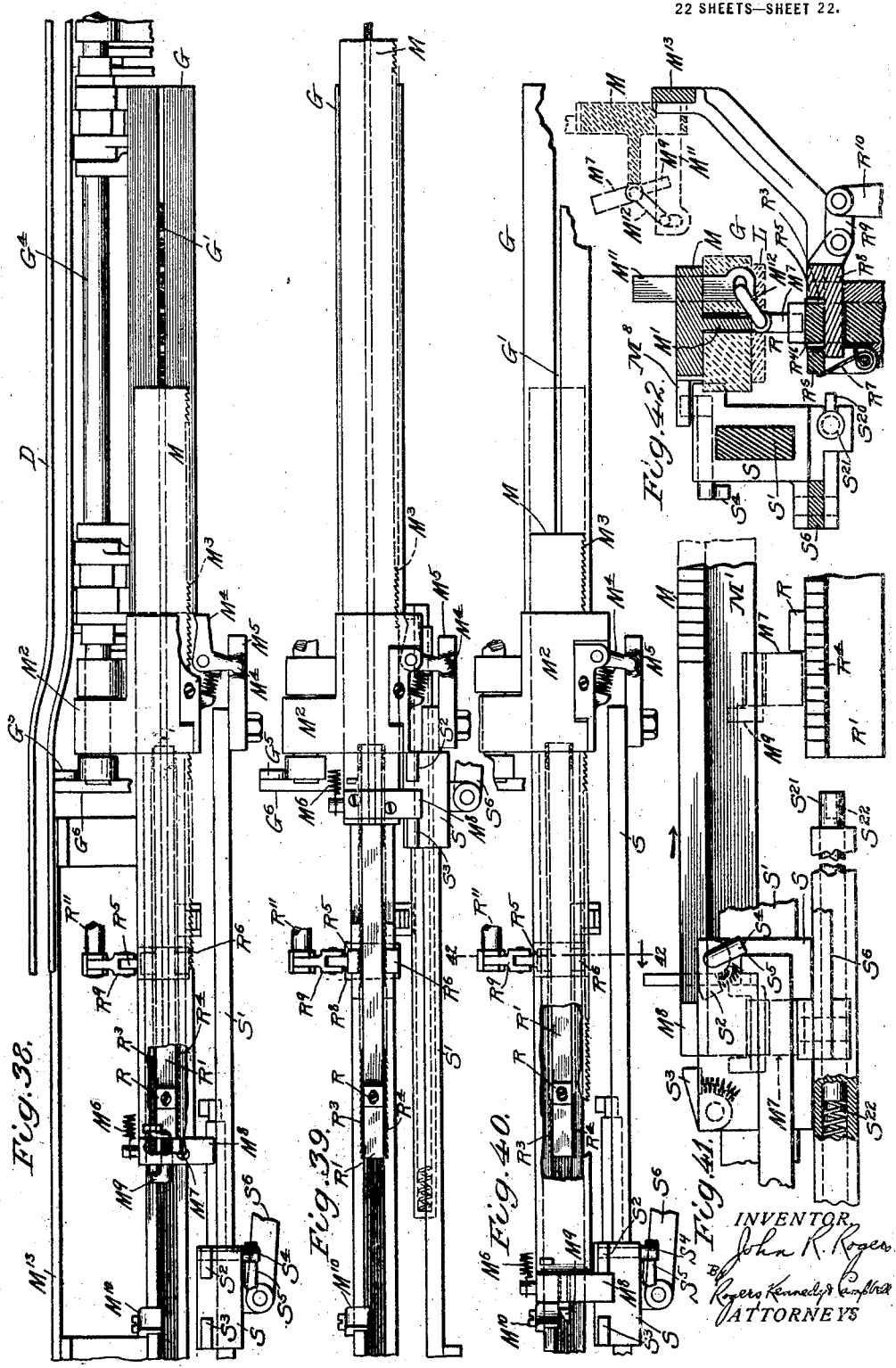

UNITED STATES PATENT OFFICE.

JOHN RAPHAEL ROGERS, OF BROOKLYN, NEW YORK, ASSIGNOR TO MERGENTHALER LINOTYPE COMPANY, A CORPORATION OF NEW YORK.

TYPOGRAPHICAL MACHINE.

1,382,549.  Specification of Letters Patent.  Patented June 21, 1921.

Application filed July 26, 1918.  Serial No. 246,805.

*To all whom it may concern:*

Be it known that I, JOHN R. ROGERS, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, and more particularly to that class thereof provided with means for casting its product in a mold with which matrices coöperate to form the line of characters. One of the principal features of the improved machine is its capability to produce the type line in the form of an integral bar or slug, or of separate and independent sections, as desired, or in other words and more specifically, as linotypes, logotypes, or single type, at the will of the operator.

In the accompanying drawings I have shown my invention only in preferred form and by way of example, and as supplied to a particular style of machine, but obviously many changes and variations may be made therein, and in its mode of application, which will still be comprised within its spirit. Similarly, it may be applied to other forms of typographical machines, such as are designed to handle type or dies, instead of matrices. Generally speaking, I desire it to be understood that I do not limit myself to any specific form or embodiment, except in so far as such limitations are specified in the claims.

Referring to the drawings:

Figure 1 is a side elevation of my improved machine.

Fig. 1ª shows the product of the machine.

Fig. 2 is a schematic plan view, the fixed relation of certain parts being somewhat altered for purposes of clearness.

Fig. 2ª illustrates the matrix and spacer.

Fig. 3 is a transverse sectional view, partly broken away, of some of the operating devices.

Fig. 3ª is a detail.

Fig. 6 is a detached perspective of the matrix selecting devices, etc.

Fig. 7 is an elevation, partly broken away, of a portion of the matrix restoring devices.

Fig. 8 is a sectional detail.

Fig. 9 is a perspective of the matrix distributer bar.

Fig. 10 is a side view of the yielding resistant, etc., showing a line in course of composition.

Fig. 11 is a similar view illustrating the delivery of the line to the casting mechanism.

Fig. 12 is a detached end view of the yielding resistant.

Fig. 13 is a view similar to Fig. 11 showing the parts in different position.

Figs. 14, 15 and 16 are respectively side, plan and rear views of a separator.

Figs. 17 and 18 are details of the two separator parts.

Figs. 19 and 20 are enlarged details of the separator tongue in different positions.

Fig. 21 is a side elevation of the separator magazine, etc., illustrating the delivery of a separator to the casting mechanism.

Fig. 22 is a similar plan illustrating the separator restoring devices.

Fig. 23 is a transverse sectional view illustrating the casting mechanism, etc.

Fig. 23ª is a detail of the trimming knives, etc.

Fig. 23ᵇ gives three sectional details illustrating different positions of the mold members, etc.

Figs. 24, 25, 26 and 27 are views somewhat similar to Fig. 23, but showing the parts in different relations.

Fig. 28 is a detail of the means for effecting the relative movement of the mold parts, etc.

Fig. 29 is a section on the line 29—29 in Fig. 28.

Fig. 30 is generally a plan of the parts shown in Fig. 23.

Fig. 31 is a similar view corresponding to Fig. 27.

Fig. 32 is a side elevation corresponding to Fig. 30.

Figure 33:
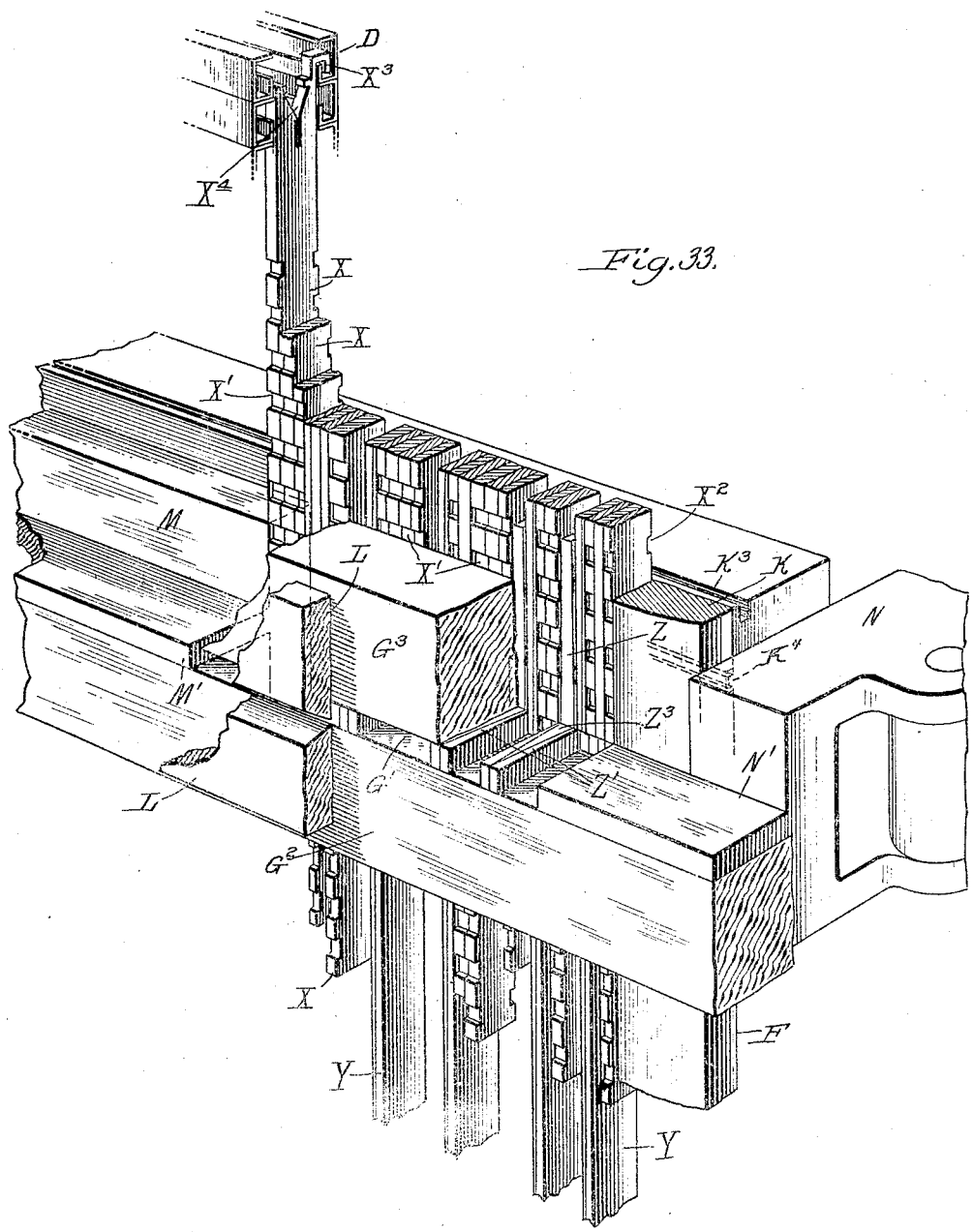

Fig. 33 is a broken away perspective of the mold, etc., illustrating the production of a line of logotypes.

Fig. 34 is a similar view after the casting operation.

Fig. 35 is a similar view after casting a line of single type.

Fig. 36 is a detached perspective of the devices for adjusting the length of the mold slot, etc.

Fig. 37 is a transverse section thereof.

Fig. 37ª is a detail thereof.

Figs. 38, 39 and 40 are plan views, viewed from the other side of the machine, of the mold slot adjusting means, etc.

Figs. 41 and 42 are respectively a side and a sectional detail thereof.

General description.

Generally speaking, the mode of operation of the machine, say for instance when it is desired to produce a justified slug or linotype, is substantially as follows: The matrices X are released one by one from their supports $A^1$ in the magazine A, and the spacers Y at the proper intervals from their special support $A^1$, and the line is composed on the rails D against the yielding resistant E, after which the follower F conveys it along the rails to the mold G, formed with the mold slot $G^1$ normally open at one end, at which point it is received between clamping jaws M and N, there justified and alined, and the slug or linotype is cast. The resistant E returns to its normal position to permit the assemblage of another line, and the follower F conveys the matrices and spacers along the curved rail $D^{15}$ and restores them to the magazine A, where they are distributed and restored to their original supports. The linotype or slug is ejected from the mold, trimmed, and deposited in a galley ready for use.

If it be desired to produce a line of justified logotypes instead of a linotype, the line is assembled in the same way, with the single exception that between each pair of word groups of matrices X is inserted a separator Z in addition to the spacer Y. The separators Z are stored in a magazine B and each separator is formed with a projecting tongue $Z^1$. The composed line is then transferred by the follower F to the mold G as before, the separators being supported by and sliding along the rail C, the tongues $Z^1$ of the separators entering the mold slot $G^1$ at its open end during the longitudinal movement of the line, and serving when the line is clamped between the jaws, as partition walls within the mold slot, whereby it is divided into a plurality of compartments so that when the metal is injected, the line is cast in a series of sections or logotypes. The separators Z are then shifted laterally to remove their tongues from the mold slot and returned along the rail $C^1$ to their magazine B. The justifying, alining, and ejecting functions, as well as the restoration and distribution of the matrices and spacers to their original supports, are effected in the same way as that before described.

Likewise, if it be desired to cast a line of single type, instead of a linotype or a line of logotypes, the steps are substantially the same, except that a separator Z is introduced into the line under composition after each individual matrix X. The subsequent operations are substantially similar, it being noted that in this instance the mold slot $G^1$ will be sub-divided by the tongues $Z^1$ of the separators so as to form a series of compartments, one for each of the single matrices, thereby producing a line of single type.

It will thus be seen that the optional production of linotypes, logotypes, or single type depends entirely upon the extent of employment of the separators Z. If none are used, a linotype will be cast; if they are introduced between words, logotypes will be formed; if set between individual characters, single type will be produced. The nature of the product is thus controlled by the operator at will by the manipulation of the separator key at the proper time, and without other alteration in the construction or adjustment of the machine. I have also provided simple means subsequently to be described, whereby in the continued casting of logotypes or of single type, the separators may be automatically delivered, in one instance by connecting their escapement mechanism to the spacer key, and in the other to the individual character keys.

Figure 1:
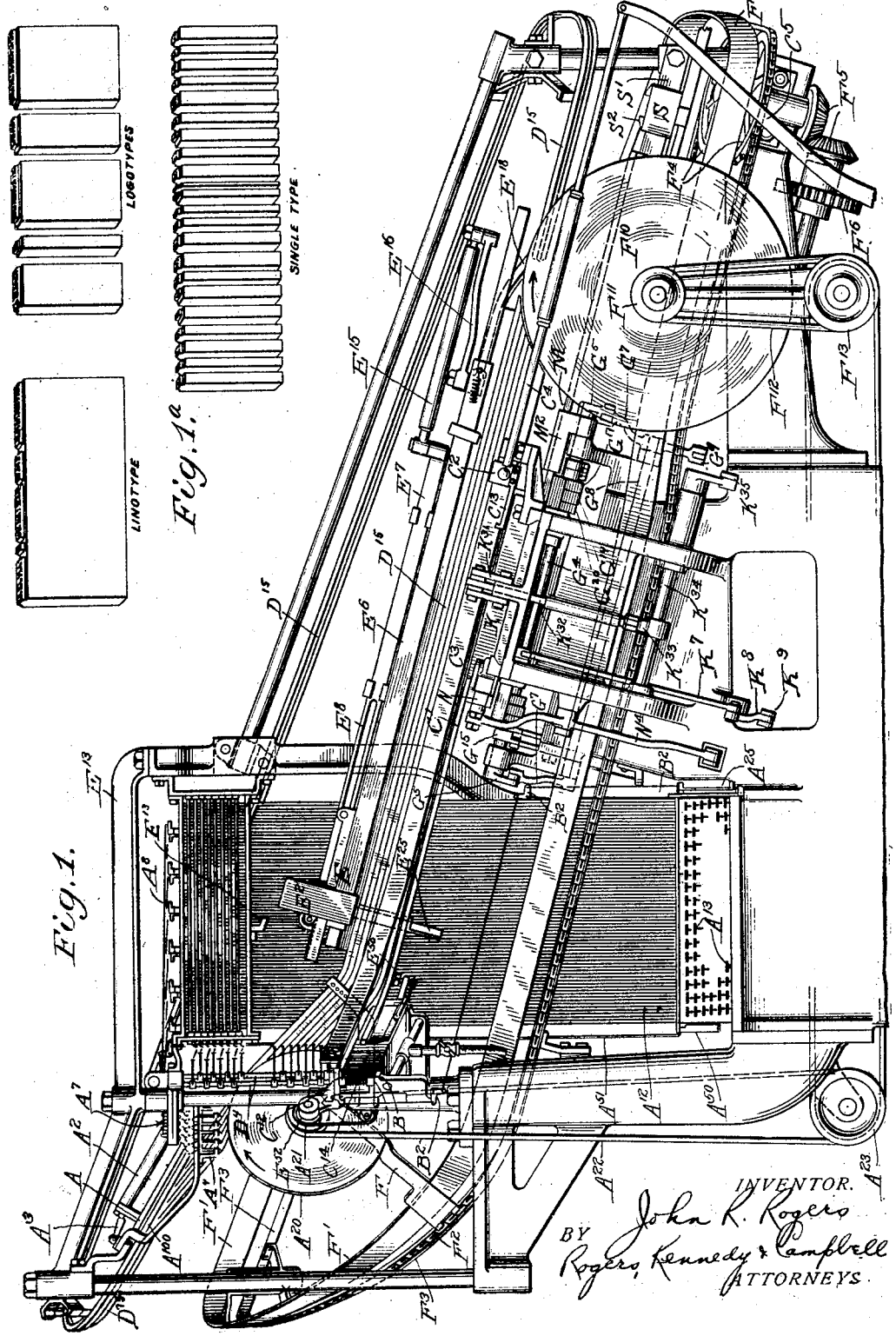

The alternative products of the machine, namely, the linotype, the line of justified logotypes, and the line of single type, are illustrated in Fig. 1ª.

Matrices, spacers, etc.

The matrix X (Fig. 2ª) is of the multiple suspended style, it being provided in its front edge with a plurality of intaglio characters $X^1$ in which the type are cast, and in its rear edge with a corresponding series of alining notches $X^2$. It is also formed with a laterally projecting hook $X^3$ whereby it is suspended in storage and in its passage to the casting position, and with a dove-tail recess or cut $X^4$ whereby it is sustained on the rail $D^{15}$ during its return to the magazine and its distribution there. As the hangers $A^1$ of the magazine A are disposed in two sections, one on each side of its center, half of the font of matrices have hooks $X^3$ projecting in one direction and the other half hooks projecting in the opposite direction. It will be noted that each of the matrices is formed with eight intaglio characters $X^1$, any one of which may be brought into operative position by the vertical adjustment of the matrix in the manner hereafter described.

The spacer Y (Fig. 2ª) is of the well known expansible variety, it being provided at its lower end with a wedge section $Y^1$ which is movable relatively to the main wedge section, to effect the thickening of the spacer and the justification of the composed line between the casting abutments, all in the manner well known in the art. In general form the spacer is similar to the matrix X, it being provided with a projecting hook $Y^3$, whereby it is suspended on its special hanger $A^1$ in the magazine A and is supported during its passage to the casting position, and with a dove-tail recess or cut $Y^4$ whereby it is sustained during its return to the magazine and its restoration there to the hanger. It also has a notch $Y^2$ to hold it firmly in position when the wedge $Y^1$ is moved relatively thereto during justification.

Magazine, escapements, etc.

The magazine A is located at the upper lefthand corner of the machine (Fig. 1) and is in the form of an open lyre-shaped frame (Fig. 4) provided with the inwardly projecting hangers $A^1$ on which the matrices are stored. The hangers and frame generally are inclined downwardly to facilitate the descent of the matrices when released at the bottom and to locate them in proximity to the escapements when restored at the top. In the present instance there are thirteen hangers $A^1$, twelve of which are utilized for the matrices X thus affording storage for a font of ninety-six characters, and the remaining one for the spacers Y. The magazine is provided with a handle $A^2$ to facilitate its ready removal from and insertion in the framework, and also with locking devices $A^3$ to hold it therein.

Figure 4:
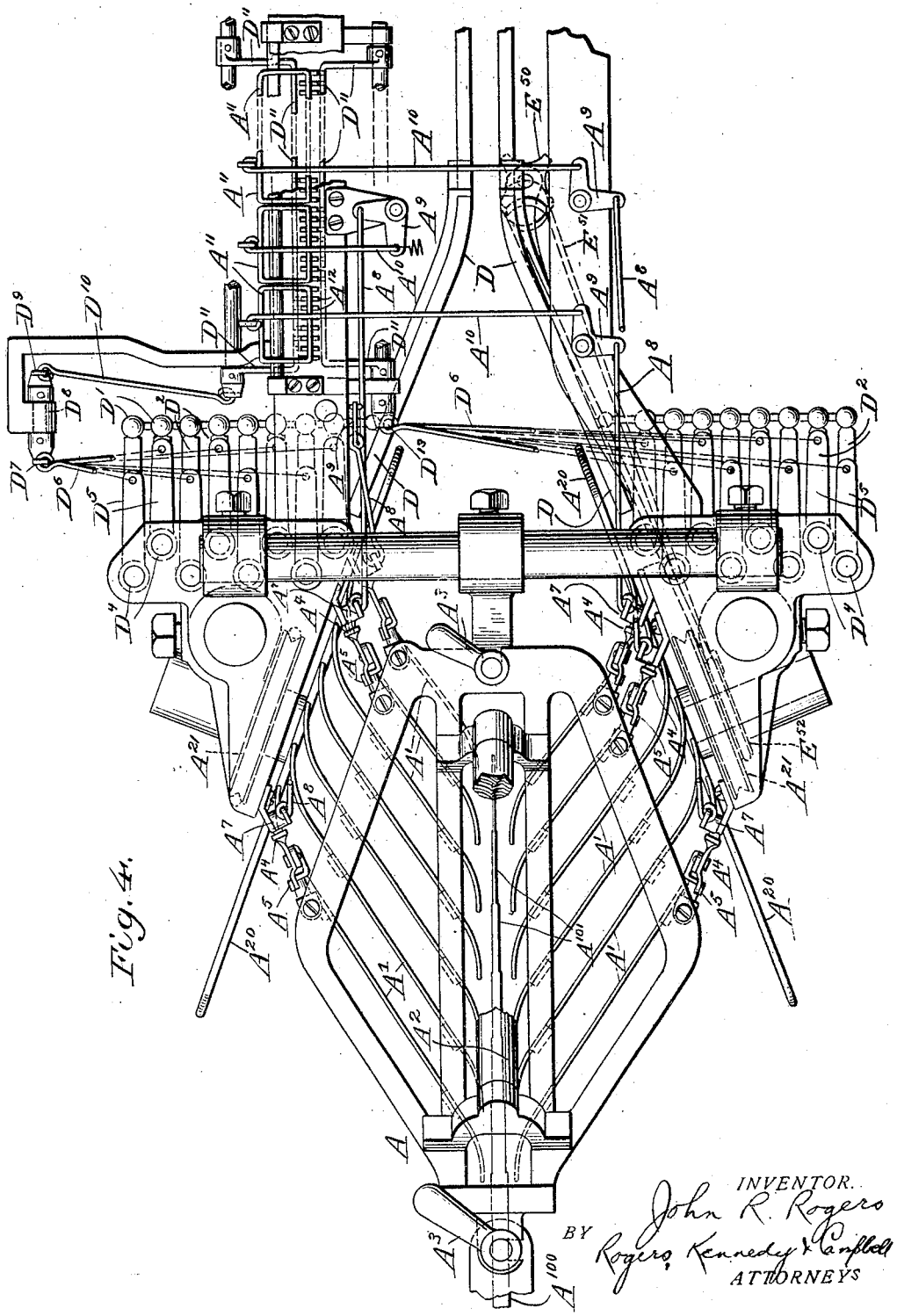
Fig. 4 is a plan view of the magazine, escapement operating mechanism, etc.
Figure 5:
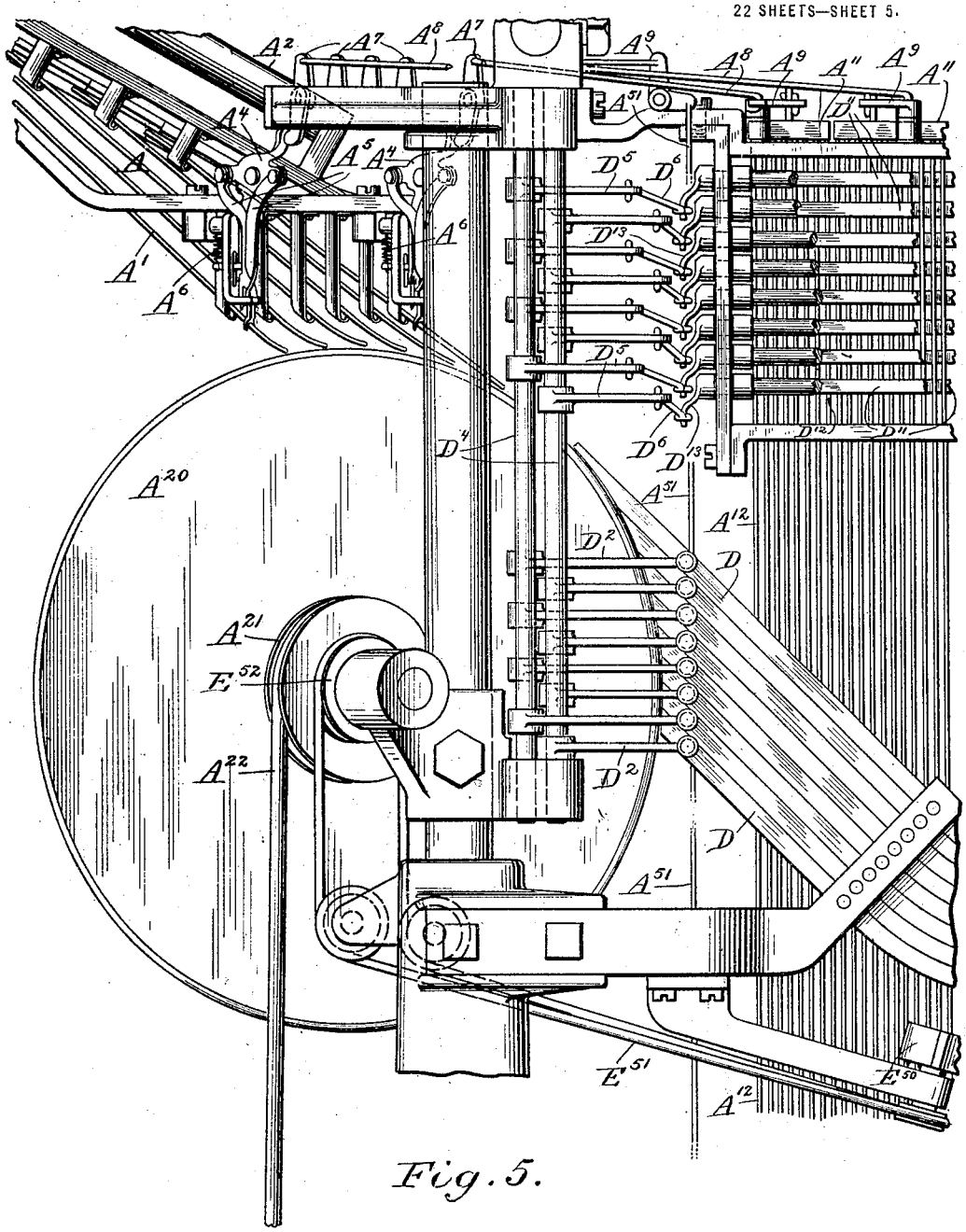
Fig. 5 is an elevation thereof.

The matrices are held in storage on the inclined hangers by suitable escapements, such for instance as those illustrated in Figs. 4, 5 and 6, comprising the lever arm $A^4$, to the opposite ends of which are connected two pawls $A^5$ which are alternately projected into and out of the path of the matrix hooks $X^3$. A spring $A^6$ connected to one of the pawls acts to hold it in engaging position and to restore it thereto after the escapement has been rocked in the opposite direction, all in the manner well known in the art.

The devices for actuating the escapements comprise levers $A^7$ located in engaging relation to the escapement levers $A^4$, links $A^8$, elbow levers $A^9$, and links $A^{10}$ to the movable frames $A^{11}$, which are rocked about their axes by reeds $A^{12}$ actuated in any suitable manner from the finger keys $A^{13}$. In view of the fact that the reeds $A^{12}$ and frames $A^{11}$ are located at one side of the magazine A, the before mentioned links, elbow levers, etc., are suitably disposed so as to actuate the escapements at both sides of the magazine.

As already noted, each matrix X is provided with eight characters $X^1$, and consequently the escapement for the group of such matrices has to be actuated by any one of eight keys $A^{13}$. This is effected by employing rocking frames $A^{11}$ of such dimensions as to extend over eight reeds $A^{12}$, the operation of any one of which (Fig. 6) serves to rock the frame $A^{11}$ and through the connections described to actuate the corresponding escapement so as to release a single matrix from the group thereof.

As already noted, the spacers Y are stored upon one of the hangers $A^1$ (Fig. 6), and their release therefrom is controlled by escapement devices $A^4$, $A^5$, $A^6$, $A^7$, $A^8$, to its special elbow lever $A^9$, which is connected by the link $A^{51}$ to the spacer key $A^{50}$ (Figs. 1 and 5).

The magazine A is also provided (Figs. 4 and 9) with an inclined distributer rail $A^{100}$ triangular in cross section and adapted to coöperate with the undercut distributing recesses $X^4$ and $Y^4$ of the matrices and spacers. The rail is formed with a series of steps $A^{101}$ diminishing in width to its lower end and located in proximity to the respective hangers $A^1$ on each side thereof. The undercut recesses $X^4$ and $Y^4$ are correspondingly formed to coöperate with the rail $A^{100}$ and to be sustained thereby until they reach their own steps $A^{101}$, at which time they fall from the rail and are returned to the proper hanger at one side or the other of the rail according to the direction of projection of the hook $X^3$ or $Y^3$ as previously set forth. The matrices and spacers are delivered to the magazine and to the distributing rail by the follower F in the manner subsequently to be described.

Longitudinal adjustment of matrices.

Figure 2:
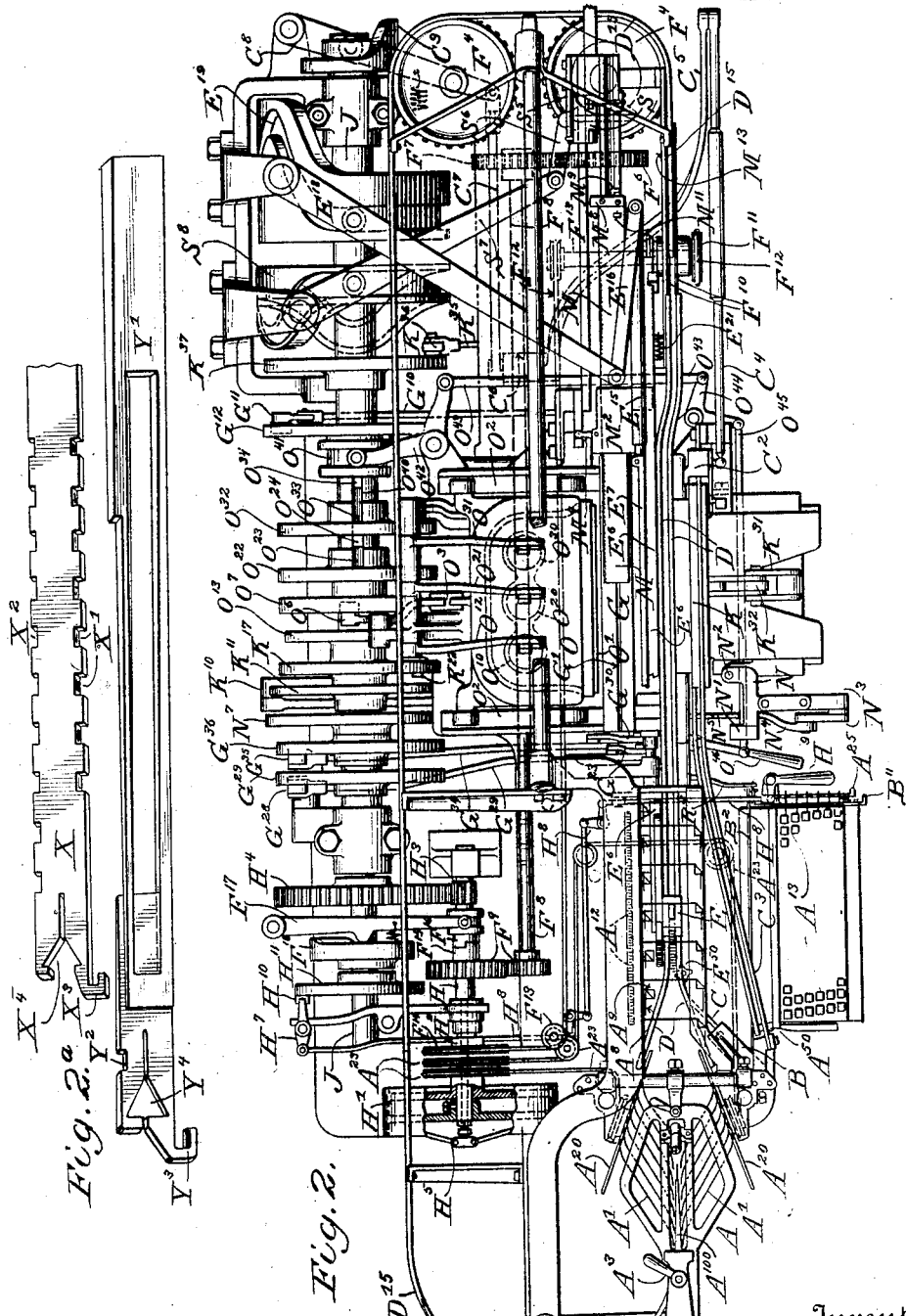

When the matrix is released from the magazine, it is next necessary to adjust it longitudinally so as to bring the desired character $X^1$ into operative position, and this is effected by the devices next to be described. As the matrices pass from the hangers $A^1$ they are delivered one by one to a rapidly rotating disk $A^{20}$, there being two such disks one located at each side of the magazine, so that as the matrices pass between them one or the other will engage the oppositely projecting hooks $X^3$, as best shown in Figs. 4, 5 and 6. The means for rotating the disks $A^{20}$ may be of any convenient form as for instance the pulley $A^{21}$, belt $A^{22}$, and further belt and pulley connections $A^{23}$ to the constantly rotated band wheel $H^1$, as shown in Figs. 1 and 2. The disks $A^{20}$ deliver the matrices to the rails D, there being two sets of these rails located respectively in proximity to the edges of the two disks and so that similarly the matrices pass between them.

The rails D are preferably in the form of boxes partly open at their inner sides to receive the hooks $X^3$ of the matrices, and are of sufficient extent to serve as supports for the matrices to and into the casting position. These rails or boxes, eight in each set, are located one above another and are independently movable into operative relation to the edge of the corresponding disk $A^{20}$ to receive the matrices therefrom, and the selection of the desired character $X^1$ on a matrix depends upon which box is brought into action. Thus, if it be the uppermost one, the matrix will be held in its highest position and the bottom character will be brought into operation. If it be the lowermost one, the matrix will be received in its lowest position bringing its highest character into action. For instance, in Fig. 6 the second guide is shown in operative position and the matrix will be thereby adjusted so as to bring the next to the lowest character into position. Therefore, by the proper selection of boxes the matrices will be longitudinally adjusted so as to present the characters desired.

The guides D are suitably supported and are preferably formed of light and flexible material so that their ends may be deflected into relation to the corresponding disk and their resiliency will subsequently restore them to normal position. The means for effecting the inward movement of the guides comprise links $D^1$ connected to the respective guides and to arms $D^2$ upon vertical rock shafts $D^4$, there being such a shaft for each of the guides D at opposite sides of the magazine (Fig. 4). The shafts $D^4$ are operated through suitable connections by rocking frames $D^{11}$ (Fig. 6) located in contiguity to the reeds $A^{12}$, which are formed with projections $D^{12}$ to contact with the frames when the reeds are elevated. There are sixteen such frames, a set of eight located on one side of the reeds and a set of eight on the other, which sets are arranged to actuate the respective rock shafts at opposite sides of the magazine, and each reed is formed with a single projection to engage its respective frame, the projections being so located as to select the desired character on the matrix which is released by the actuation of the reed. The rock shafts $D^4$ are also provided with arms $D^5$ which in turn are operated by links $D^6$. In the case of the shafts located at the front of the machine (Figs. 4 and 5), the links $D^6$ are connected directly to arms $D^{13}$ on the rock frames $D^{11}$ at one side of the reeds. The links $D^6$ which operate the arms $D^5$ at the rear side (Figs. 4 and 6) are connected to arms $D^7$ on rock shafts $D^8$, also formed with arms $D^9$ which in turn are connected by links $D^{10}$ to arms on the rock frames $D^{11}$ at the other side of the reeds. This difference in connecting devices for rocking the shafts $D^4$ and locating the guides D at opposite sides is due to the unsymmetrical position of the reeds with relation thereto.

The mode of selection of any desired character will now be clear. The operation of the key $A^{13}$ and of the corresponding reed $A^{12}$ effects two results, one the release of the matrix through the actuation of the rock frame $A^{11}$ by the reed, and the other the desired longitudinal adjustment of the matrix by the actuation of the frame $D^{11}$ by the reed projection $D^{12}$. I have not illustrated the devices through which the pressing of a key effects the actuation of the reed. These may be of any desired and well known form, although preferably I would employ the ordinary power operated keyboard mechanism such as is embodied in the commercial linotype machine, and particularly as this is well adapted to secure the proper synchronism and dwell of the parts. As already stated, the spacers Y are released by their escapement upon the actuation of the key $A^{50}$, in the same manner as the matrices X, and it will be understood that they will similarly be delivered to some particular one of the guides D, but always at the same level, there being no necessity for their longitudinal adjustment.

Separators, etc.

The separator, already referred to, is best illustrated in Figs. 14 to 20 inclusive. It consists of two parts, the outer one or separator proper Z being in the form of a bent band of resilient metal, open at one edge and there provided with two narrow projections constituting the tongue $Z^1$ of such size and shape as to enable it to project into the mold slot and to partition it into sections. Inside of the outer member is located an inner one $Z^2$ formed with a wedge-like projection $Z^3$ adapted to enter between the two parts of the tongue $Z^1$ (Fig. 15). The member $Z^2$ is permitted a slight relative backward and forward movement with relation to the member Z (Fig. 14) so that its wedge $Z^3$ may slightly thicken the tongue $Z^1$ or permit it to spring back to its minimum width. The first of these positions is illustrated in Fig. 19 which is that during casting, and the second in Fig. 20 when the tongue $Z^1$ is collapsed to permit its ready withdrawal from the mold slot. The section $Z^2$ is further provided with two flaring offset wings $Z^4$ adapted to give the separator a wide base and to insure firm and rigid bearing against the separator box and a perpendicular relation to the mold during casting, and also with a hook $Z^5$ whereby the separator is supported in its travels.

The separators are stored in the magazine B in proximity to the disk $A^{20}$ (Fig. 1) and suitably located and inclined to deliver the separators, or rather their tongues $Z^1$, into the line during composition. The release of the separators from the box one at a time is controlled by the escapement $B^1$ (shown in dotted lines in Fig. 21) which is actuated by suitable connections $B^2$ upon the operation of the key $A^{25}$ in the keyboard mechanism, (Fig. 36). Upon the release of the separators, their hooks $Z^5$ engage on the inclined rail $C$, located beneath one of the series of guides $D$, along which they pass with the matrices and spacers to the casting point.

As already pointed out, the nature of the product of the machine, linotype, logotype or single type, may be controlled by the manipulation of the key $A^{25}$ so as to deliver separators at the proper intervals. Means are also provided to insure their automatic delivery to obtain the desired product, as best shown in Fig. 36. The key $A^{25}$ is formed at one end of a plate $B^{10}$, the movement of which actuates the spacer escapement through the connections $B^2$. This plate is pivoted to the longitudinally adjustable bar $B^{11}$ so as to rock laterally with reference thereto and is adapted to support on its upper edge the end of a rod $B^{14}$ connected to the spacer key $A^{50}$ as well as the ends of the $B^{15}$ connected to the respective banks of character keys $A^{13}$. This is the relation of the parts illustrated in Fig. 36, and it will be seen that the manipulation of any character key or of the spacer key effects the delivery of a separator through the rocking of the plate $B^{10}$ without the manual actuation of the key $A^{25}$. In other words, when the parts are thus set, separators will be introduced into the line between the individual characters and the product of the casting will be a line of single type. It is to be observed that the plate $B^{10}$ is formed with a series of notches $B^{13}$ in proximity to the ends of the rods $B^{15}$, and with a single shorter notch $B^{12}$ located at a further distance from the end of the rod $B^{14}$. If it be desired to cast logotypes, involving the delivery of separators between words only, the adjustable bar $B^{11}$ is moved longitudinally to a sufficient extent to bring the notches $B^{13}$ beneath the rods $B^{15}$, but with the rod $B^{14}$ still resting on the plate $B^{10}$. In these relations, the operation of the keys $A^{13}$ delivers characters only, although the operation of the spacer key $A^{50}$ still effects the delivery of a separator at the end of a word, the condition necessary to produce logotypes. If next it be desired to cast a linotype, the bar $B^{11}$ is adjusted still further, so as to bring the notch $B^{12}$ under the rod $B^{14}$ but leaving the longer notches $B^{13}$ under the rods $B^{15}$. In this position, the actuation of the character and spacer keys does not effect the delivery of separators and a slug will be produced.

Yielding resistant, etc.

When the line is being composed, the matrices and spacers (with or without the separators Z) are delivered against the yielding resistant $E$ (Fig. 10), and when it is completely assembled it is transferred by the follower $F$ to the casting point (Fig. 11). The resistant is then freed from the line, see Fig. 13, and returns to its original position, shown in dotted lines, so as to permit the composition of a second line simultaneously with the casting, etc. of the first.

The resistant $E$ comprises the member $E^{25}$, which actually engages the line under composition and the box $E^2$ wherein the member $E^{25}$ is longitudinally movable. The box $E^2$ is fixedly mounted upon the slide $E^6$ arranged to travel longitudinally upon the internal guide $E^{20}$, the spring $E^{21}$ connected to the slide and guide (Figs. 10 and 11) acting to hold the resistant in normal position and to permit it to yield step by step as the line is composed. The box $E^2$ (see also Fig. 12) also carries a pair of connected pinions $E^3$ and $E^4$, the former meshing with a rack in the edges of the member $E^{25}$ and the latter with the rack $E^5$ supported on the slide $E^6$. The rack $E^5$ is actuated at suitable intervals so as to lower the member $E^{25}$ into operative position (Fig. 10) and to elevate it out of the path of the line (Fig. 13). The member $E^{25}$ is also provided with a pivoted latch $E^1$ formed with two oppositely projecting lugs, one $E^9$ to engage the recess $E^{12}$ in the box and to hold the member $E^{25}$ in lowered position (Fig. 10), and the other $E^{10}$ adapted to engage the recess $E^{11}$ in the box to hold it in elevated position (Fig. 13). A spring $E^{17}$ acting upon the latch $E^1$ serves to engage the lugs $E^9$ and $E^{10}$ with the respective recesses $E^{12}$ and $E^{11}$ when in registry therewith. In either instance, due to the locking of the member $E^{25}$, the pinions $E^3$, $E^4$, are held against rotation so that the longitudinal movements of the rack $E^5$ at this time serve to shift the entire resistant $E$ from the assembling position to the casting position and vice versa.

The longitudinal movements of the rack $E^5$ are imparted thereto by the link $E^7$ formed with the slot $E^8$ which engages a pin on the end of the rack. After the line is composed, the link moves in the direction of the arrow in Fig. 10, and due to the locking of the pinions by the engagement of the lug $E^9$ with the recess $E^{12}$, the resistant is shifted as a whole to the casting position shown in Fig. 11. At this time the lug $E^{10}$ strikes the fixed projection $E^{14}$, arresting the resistant and also removing the lug $E^9$ from the recess $E^{12}$, thereby freeing the pinions so that the further movement of the rack $E^5$ elevates the member $E^{25}$ to the position shown in Fig. 13. At this time the lug $E^{10}$ engages the recess $E^{11}$, again locking the pinions. The link $E^7$ then begins its return movement and after its first lost motion, and when the further end of the slot $E^8$ engages the pin on the rack $E^5$, the resistant is conveyed as a whole to the dotted line position (Fig. 13), at which time the lug $E^9$ strikes the fixed abutment $E^{13}$ (see also Fig. 1) thereby arresting the resistant and disengaging the lug $E^{10}$ from the recess $E^{11}$. This frees the pinions and the further movement of the rack $E^5$ again lowers the member $E^{25}$ to the position shown in Fig. 10, with the lug $E^9$ in locking engagement with the recess $E^{12}$, when the parts come to rest.

The longitudinal reciprocation of the link $E^7$ is effected (Figs. 1 and 2) by the farther links $E^{15}$ and $E^{16}$ to the cam arm $E^{18}$ which is swung about its pivot by the groove cam $E^{19}$ upon the main shaft J.

As shown in Fig. 10, a star wheel $E^{50}$ is employed to advance the line under composition against the yielding resistant E. This star wheel may be of any desired form, such as the side-wiping variety used in connection with suspended matrices, and it may be actuated in any preferred manner, as by the pulley and belt connection $E^{51}$ to the pulley $E^{52}$ connected to the pulley $A^{21}$ (best shown in Fig. 5). As previously pointed out, the pulley $A^{21}$ is actuated by the connections $A^{22}$, $A^{23}$, to the band-wheel $H^1$.

Follower.

The follower F which transports the composed line to the casting point and afterward restores the matrices and spacers to the magazine A, stands in its normal position (Fig. 1) between the disks $A^{20}$ and to the rear of the point of assemblage, in readiness when the machine is set in motion to pass between the boxes or rails D with the line before it to the casting devices (Figs. 11 and 13). It is in the form of an extended arm projecting upwardly from and guided upon the endless track $F^1$. Motion is imparted to the follower by the sprocket chain $F^2$ (Fig. 13) extending about the machine and contained for a portion of its length within the guide $F^3$ (Fig. 23). From a point beyond the casting devices the track $F^1$, chain $F^2$ and guide $F^3$ extend beneath and in parallelism to the return rail $D^{15}$ (Fig. 1) so that the follower will restore the matrices and spacers to the magazine and return to its normal position.

The travel of the follower is divided into two parts, one to the casting position where it remains in contact with the line until the casting is completed, and the other from that point around with the rail $D^{15}$ to its normal position of rest. The chain $F^2$ through a portion of its exposed path engages about the sprocket wheels $F^4$, to one of which motion is imparted by the bevel pinions $F^5$, gear $F^6$, gear $F^7$ (Figs. 1 and 2) on the shaft $F^8$, and gears $F^9$, one of which is mounted on the sleeve $F^{15}$ loose on the intermittently rotated power shaft H and is adapted to be rotated by the clutch member $F^{16}$ also on said shaft and turned thereby through a spline (not shown). The engagement of the clutch member $F^{16}$ with the sleeve $F^{15}$, so as to give the latter two periods of rotation with a rest between them, is controlled by the cam arm $F^{17}$ and the suitably shaped cam $F^{18}$ on the main shaft J.

In order to restore the matrices and spacers to a common level as they pass from the rails D to the single return rail $D^{15}$, I preferably employ a pair of rotating disks $F^{10}$ (somewhat similar to the disks $A^{20}$) at the ends of the rails D, as best shown in Figs. 1, 7 and 8. These disks are suitably arranged to receive the matrices and spacers by their hooks $X^3$ or $Y^3$ from the respective sets of rails D at each side and to convey them forward to the end of the return rail $D^{15}$ which is located between the disks in position to engage the cuts $X^4$ and $Y^4$. The matrices and spacers are then conveyed along the rail $D^{15}$ and returned to the magazine A at its top by the follower F, in the manner previously set forth. The means for rotating the disks $F^{10}$ (Figs. 1 and 2) comprise pulley $F^{11}$ and band $F^{12}$ and the belt and pulley connections $F^{13}$ to the pulley $F^{14}$ connected to the constantly rotated band-wheel $H^1$.

Separator box, etc.

As previously noted, when the composed line is transferred to the casting devices, the matrices and spacers travel along and are sustained by the guides D, whereas the separators Z move along the rail C. When the separators arrive in the casting position they are received by the box K (see Figs. 27, 33, 34 and 35) formed with the longitudinal recess $K^1$ and front slot $K^2$ into which the offset wings $Z^4$ and tongues $Z^1$ respectively pass. The box is further formed at its top with the groove $K^3$ designed to receive and sustain the hooks $Z^5$, as best indicated in Fig. 34, which also shows the wings $Z^4$ in dotted lines within the recess $K^1$, whereby the separators are held in position. On the front face of the box is formed a longitudinal rib $K^4$ adapted to engage the notches $X^2$ and $Y^2$ in the matrices and spacers and thus provide an abutment to hold them during alinement and justification respectively.

When the line with the separators passes into the casting position, the tongues $Z^1$ encounter the sprue-plate L which is formed with a beveled or rounded corner $L^1$ (Fig. 30) so that the tongues $Z^1$ are cammed backward as the line moves in. This action causes the rearward relative movement of the two separator sections with the double effect of slightly spreading the tongue members against the interposed wedge $Z^3$ (Fig. 19) so that the parts are in the casting position, and further of firmly seating the flaring offset wings $Z^4$ against the rear wall of the recess $K^1$ in the box.

*Casting, etc.*

When the line is received in the casting position it comes to rest against the jaw or abutment M connected to the far mold liner $M^1$ (Figs. 3, 10, 11, 13, 24, 27, 30, 31, 32, 33, 34, 36, 37, 38, 39, 40, 41 and 42). At this time a swinging jaw N closes in behind the rear end of the line and embraces the follower F, the jaw N being formed with the near mold liner $N^1$ which enters the mold slot $G^1$ and closes the front end of the mold (Figs. 1, 2, 3, 13, 23, 24, 25, 27, 30, 31, 32, 33, 34 and 35). The line is now ready for alinement and justification.

Figure 3:
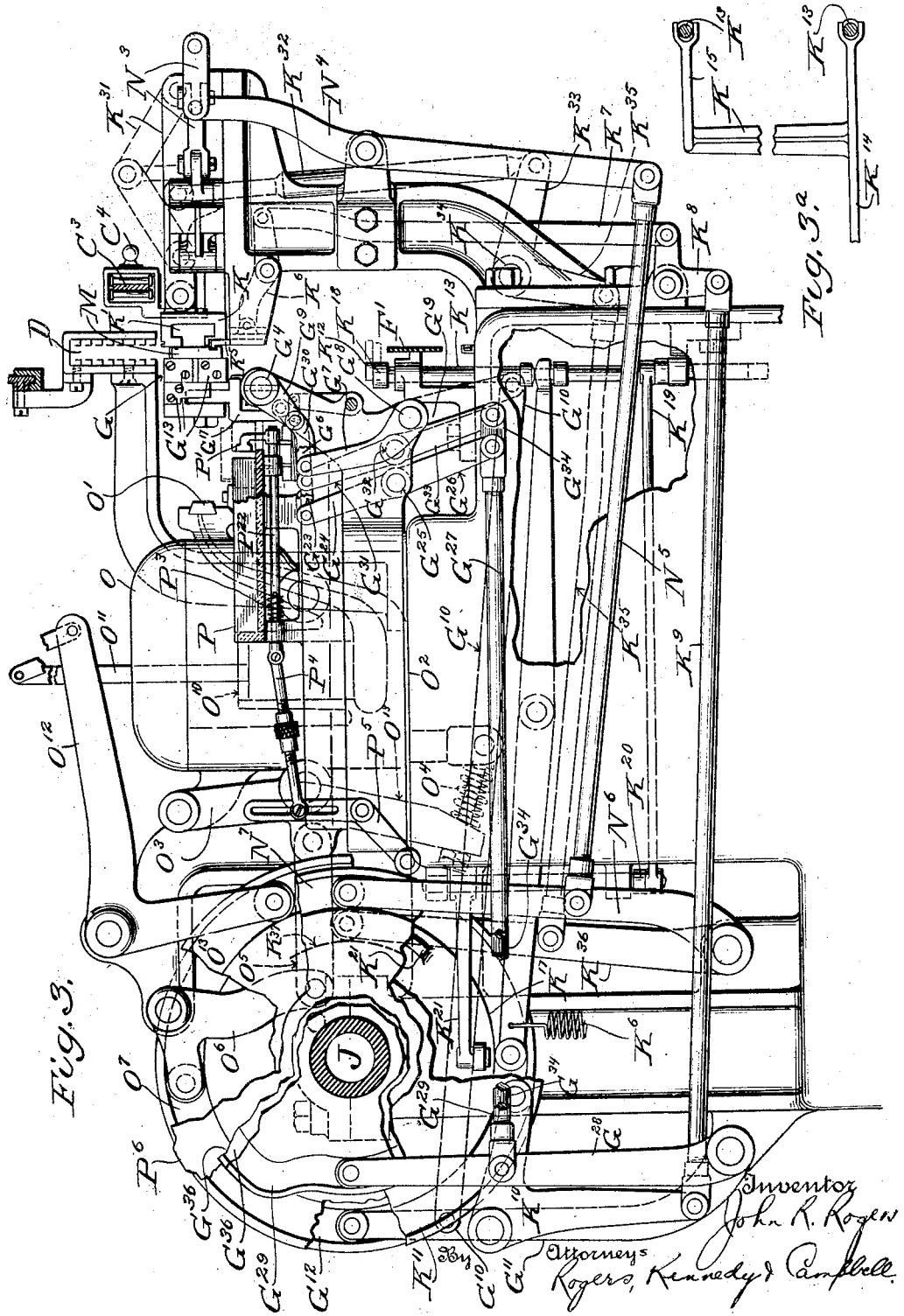

The means for swinging the jaw N about its pivot $N^2$ are best illustrated in Figs. 1, 2 and 3, and also in part in Figs. 23, 24, 25, 30, 31 and 32. They comprise a pair of links $N^3$, lever $N^4$, link $N^5$, and cam lever $N^6$ to groove cam $N^7$ on shaft J.

The alinement of the matrices against the rib $K^4$ is effected by the blade $K^5$ adapted to engage in the presented notches $X^2$ (Figs. 3, 23, 24, 25, 27), the necessary movements being imparted to said blade by the lever arm $K^6$, shown in dotted lines in Figs. 23, 24, 25 and 27 and in end elevation in Fig. 32, by link $K^7$ (Fig. 3), elbow lever $K^8$, link $K^9$ and pivoted cam lever $K^{10}$ to the groove cam $K^{11}$ on shaft J (see also Fig. 2).

When the spacers are held in position by the engagement of the rib $K^4$ with the notches $Y^2$, the justification is effected in the usual manner through the elevation of the wedges $Y^1$ by the justifying bar $K^{12}$ (Figs. 3, 23, 24, 31 and 32). In the present instance the bar $K^{12}$ is mounted upon a pair of vertically guided rods $K^{13}$, to which the necessary rising movement is imparted (Fig. 3) by the lever $K^{14}$ and spring $K^{16}$ under control of the cam $K^{17}$ on the shaft J (see also Fig. 2). The lever $K^{14}$ engages one of the rods $K^{13}$ directly and the other rod through its projecting arm $K^{15}$, as shown in Fig. $3^a$.

As will be seen in Fig. 23, the justifying bar $K^{12}$, when in active position, projects across the path of the incoming line and follower F, and consequently further means are provided whereby it will be shifted out of the way at other times, as shown in Figs. 3, 24 and 31. To this end, the bar $K^{12}$ is mounted on the rods $K^{13}$ by link and arm connection $K^{18}$, so that if one of the rods be partially rotated the bar is shifted to active or inactive position. The rotary movement of the rod $K^{13}$ in one direction (Fig. 3) is effected by a link $K^{19}$ connected at one end to an arm on the rod and at its other end to an arm on the vertical shaft $K^{20}$, which in turn carries a cam arm $K^{21}$ adapted to be engaged by the side projection $K^{22}$ on the justifying cam $K^{17}$ already described (see also Fig. 2). The movement of the rod in the opposite direction, to shift the bar $K^{12}$ to its normal or inactive position, is secured (Fig. 31) by a spring $K^{23}$ connected to the link $K^{19}$.

The pot O (Figs. 2, 3, 23, 24, 27, 30 and 31) then advances and brings its mouth $O^1$ into engagement with the sprue-plate L at the rear of the mold and presses the mold firmly against the composed line. The pot is mounted on the horizontal slideway $O^2$ (Figs. 2 and 3) and the means for advancing and subsequently retracting it thereon comprise the pivoted arm $O^3$, acting through the interposed spring $O^4$, link $O^5$, cam lever $O^6$, and groove cam $O^7$ on the shaft J.

Molten metal is next injected through the pot mouth $O^1$ into the mold slot $G^1$ by the pump $O^{10}$ (Figs. 2 and 3) actuated by the rod $O^{11}$, cam lever $O^{12}$, and groove cam $O^{13}$ on the shaft J. For ordinary lines the single pump $O^{10}$ will be adequate, but to facilitate the casting of lines of greater length, not only have the pot and pot mouth been considerably extended, but also two additional pumps $O^{20}$ and $O^{30}$ (Fig. 2) have been provided, one or both of which may be brought into action when desired. These pumps are actuated in the ordinary manner by levers $O^{21}$ and $O^{31}$ respectively to the groove cams $O^{22}$ and $O^{32}$. The cams are loosely mounted on the shaft J and their hubs are formed with notches $O^{23}$ and $O^{33}$ adapted to receive the respective keys $O^{24}$ and $O^{34}$ which are adjustably mounted in a longitudinal groove $O^{40}$ in the shaft. These keys are connected and are suitably disposed so that they may be shifted longitudinally to engage both keys in their respective notches, or only the key $O^{24}$ in the notch $O^{23}$. The means for positioning the keys comprise the collar $O^{41}$, elbow $O^{42}$, link $O^{43}$, elbow $O^{44}$, and link $O^{45}$ to the manually controlled lever $O^{46}$ at the side of the keyboard. It will be seen that by the proper manipulation of this lever the operator may bring into action one or both of the pumps $O^{20}$ and $O^{30}$ in addition to the pump $O^{10}$ according to the length of line to be cast.

*Separator retraction, etc.*

During the casting operation, the box K is in its forward position pressing against the side of the composed line and holding the separator tongues $Z^1$ in the mold slot $G^1$ (Figs. 3, 23, 30 and 33). When the cast is complete, the box moves rearwardly to inactive position relieving the side pressure on the line and withdrawing the tongues from the mold slot) Figs. 2, 24, 25, 27, 31, 34 and 35). This retreat first effects the rearward relative movement of the separator members $Z^2$, retracting the wedges $Z^3$ and permitting the tongues $Z^1$ to collapse to the position shown in Fig. 20, with the result of loosening the line and permitting the easy retraction of the tongues by the further backward movement of the box.

The forward position of the box K with the separator tongues in the mold slot is best shown in Fig. 33, wherein the parts are arranged to produce a series of logotypes, that it to say, with separators located between word groups of matrices and their tongues acting to partition the mold slot into corresponding compartments. Fig. 34 shows the box and separators in retracted position with a series of logotypes remaining in the mold. Fig. 35 similarly illustrates the retracted position, but in this instance separators are employed between individual matrices so as to form single type in the mold.

The means for shifting the separator box to and from its casting position are best shown in Figs. 1 and 3, and in part in Figs. 24, 25, 27, 30, 31 and 32. The box is suitably guided to slide in the framework and is directly actuated by the toggle $K^{31}$ which receives its motion from a link $K^{32}$, arm $K^{33}$, rock shaft $K^{34}$, arm and link $K^{35}$ and cam lever $K^{36}$ to groove cam $K^{37}$ on shaft J (see also Fig. 2).

When the separator box is retracted, and the jaw N swung back out of the way, the separators are in registry with the return rail $C^1$ previously mentioned, so that they will be supported thereon by the hooks $Z^5$ in their return to the magazines B, as shown in Figs. 2, 22, 24, 25 and 31. The means for shifting the separators out of the box and their hooks from the groove $K^3$ to the return rail $C^1$, comprise the slide $C^2$ arranged to travel on the guide $C^3$ (Figs. 1, 2, 22, 23, 24, 25, 30, 31 and 32), the slide being actuated in its reciprocating movements by the link $C^4$ and curved arm $C^5$ (Fig. 1) on the rock shaft $C^6$ having a second arm at its opposite end, and a link $C^7$ to the spring pressed cam lever $C^8$ and the cam $C^9$ on the shaft J, shown partly in dotted lines in Fig. 2.

When the separators arrive at the magazine B, they are restored thereto by the devices best illustrated in Figs. 21 and 22. The separators are normally stored upon the ledge $C^{10}$ in the magazine, its upper portion $C^{11}$ being in the form of a pivoted switch and adapted to swing outwardly from the ledge $C^{10}$, the resilient arm $C^{12}$ yielding to permit such final movement of the slide. The switch $C^{11}$ is formed with a resilient arm $C^{12}$ normally in the path of the forwardly projecting arm $C^{13}$ on the slide $C^2$. Just before the slide arrives at its farthermost position, as shown by dotted lines, the projection $C^{13}$ contacts with the arm $C^{12}$ and throws the switch outwardly and into registry with the return rail $C^1$, and during the final movement of the slide the spacers are transferred to the switch from the rail. When the slide returns, a spring $C^{14}$ connected to the switch restores it to normal position and the separators thereon pass to the ledge $C^{10}$, it being noted that the return movement of the switch is sufficiently rapid to prevent the escape of the separators by gravity therefrom. If desired, further means, such as would readily occur to any mechanic, may be provided to retain the separators positively in place on the switch during its return movement.

Mold.

The mold G comprises two relatively movable members, the body $G^2$ and the cap $G^3$, which constitute the side walls of the slot $G^1$, and, as previously indicated, its end walls are formed by the liner $N^1$ connected to the swinging jaw N and the liner $M^1$ integral with the jaw M. As subsequently explained, the liner $M^1$ is automatically set to adapt the mold slot to the length of the line to be cast, and also is actuated longitudinally of the slot to eject the cast therefrom. The jaw M and liner $M^1$, as well as the sprue-plate L, are connected to the mold and move with it to its several positions.

The upright or casting position of the mold is best illustrated in Figs. 3, 10, 11, 13, 21, 23, 24, 25, 28, 30, 32, 33, 34 and 35, it being mounted upon the rock shaft $G^4$, about which it is swung through an angle of 90° (Figs. 26 and 29) to its horizontal or ejecting position illustrated in Figs. 2, 27, 31, 36, 38, 39 and 40. In this movement the jaw M is shifted out of the path of the line so that the way is cleared for the follower to resume its travel and restore the matrices and spacers to the magazine A.

The means for swinging the mold about the rock-shaft $G^4$ from the casting to the ejecting position, and vice versa, comprise arms $G^5$ at opposite ends of the shaft, links $G^6$ to arms $G^7$ (Figs. 1 and 3) on rock shaft $G^8$, arm $G^9$ thereon, and link $G^{10}$ to cam lever $G^{11}$ and groove cam $G^{12}$ on shaft J (Figs. 2 and 3).

When the mold turns down to its lower position, as shown in dotted lines in Fig. 3, it is brought into delivery relation to the galley P, wherein the successive type lines are assembled side by side in column, and it is at this time that the jaw M and liner $M^1$ move out to the end of the slot $G^1$ (Fig. 39) to eject the cast therefrom. As the slug or other product passes into the galley, the successive lines are advanced therein by the reciprocating pusher $P^1$ mounted on the rod $P^2$, which is moved in one direction by the attached spring $P^3$ and in the other by link $P^4$, cam lever $P^5$ and cam projection $P^6$.

As the slug, etc., passes from the mold into the galley it is trimmed by knives $G^{13}$, shown in Figs. 3, 23ª, 23ᵇ and 27, but omitted from other views for the sake of clearness. The knives $G^{13}$ are three in number, two connected respectively to the body member $G^2$ and cap $G^3$ of the mold to effect the side trimming, and the third to the cap support to trim the edge, all as well understood in the art.

In addition to the rotary movement of the mold about the shaft $G^4$ to locate it in casting and ejecting positions respectively, its constituent parts, the body $G^2$ and cap $G^3$, are independently mounted on the shaft so as to be capable of relative adjustment with relation thereto in a radial direction to position the mold and vary the width of the slot properly at different stages of the operation.

Fig. 23ª and the left-hand section of Fig. 23ᵇ show the relative position of the body and cap when the composed line is being transferred thereto. At this time the slot $G^1$ is given its maximum width to permit the free entry of the separator tongues $Z^1$ between the upper and lower knives $G^{13}$.

In Fig. 23 the parts are illustrated as clamped in their casting relations, with the slot $G^1$ at its minimum width and the body and cap pressing upon the tongues $Z^1$ (see also middle section of Fig. 23ᵇ).

After the cast (Fig. 24) the pot O retreats and the cap rises slightly to enlarge the mold slot and facilitate the withdrawal of the separator tongues and the liner $N^1$ therefrom.

Then (Fig. 25) the cap resumes its former position and clamps the slug against the body so as to hold it firmly during the sprue breaking operation subsequently to be described.

Next (Fig. 26) the mold begins to rock backwardly from its upright position, and to obviate the tendency to bind between the cameo characters on the slug and the intaglio ones in the matrices arising from the upward component of the rocking motion, the mold is given a slight downward adjustment relatively to the shaft to counteract it.

In Fig. 27 the mold is shown in its horizontal position with the cap and body separated slightly to relieve the pressure on the slug and permit its ejectment by the liner $M^1$. These relations are also illustrated in the right-hand section of Fig. 23ᵇ.

These successive movements of the mold and mold sections relatively to the shaft $G^4$ are effected through their mountings thereon and the actuating devices next to be described. The mold body $G^2$ is supported by a pair of eccentric straps $G^{14}$ surrounding eccentric sleeves $G^{15}$ loose on the shaft $G^4$ and formed with operating arms $G^{16}$ (Figs. 23, 23ª, 24, 25, 26, 27, 28, 30, 31 and 32). The mold cap $G^3$ is similarly carried by a pair of straps $G^{17}$ on eccentrics $G^{18}$ loose on the sleeves $G^{15}$ and formed with the operating arms $G^{19}$. It will be seen that the rotation of the inner eccentrics $G^{15}$ shifts both body and cap relatively to the shaft $G^4$, while the rotation of the outer eccentrics $G^{18}$ on the inner ones shifts the cap relatively to the body. The rocking movement of the shaft $G^4$ is imparted to the mold members by the arms $G^{20}$ fast thereon and connected by sliding feathers $G^{21}$ to the straps $G^{14}$ of the mold body $G^2$ (Figs. 28, 30 and 31), the said straps being similarly connected by feathers $G^{22}$ to the straps $G^{17}$ of the mold cap $G^3$.

The means for rotating the eccentrics $G^{15}$ on the shaft $G^4$ comprise the links $G^{23}$ connected to the arms $G^{16}$ and to arms $G^{24}$ on rock shaft $G^{25}$ (Fig. 3) carrying an arm $G^{26}$ connected by link $G^{27}$ to cam lever $G^{28}$ and groove cam $G^{29}$ on shaft J (Fig. 2). Similarly the rotating devices for the eccentrics $G^{18}$ are the links $G^{30}$ connecting arms $G^{19}$ to arms $G^{31}$ (Fig. 3) on shaft $G^{32}$ carrying an arm $G^{33}$ connected by link $G^{34}$ to cam lever $G^{35}$ (Fig. 2) and groove cam $G^{36}$ on shaft J. As well understood in the mechanical arts, the contours of the eccentrics $G^{15}$ and $G^{18}$ and of the cams $G^{29}$ and $G^{36}$ are such as to give the mold and its members the relative positions already described at the times indicated.

The sprue-plate L (Figs. 23, 24, 25, 26, 27, 28, 29, 30, 31, 33, 34 and 35), wherein is formed the sprue (Figs. 34 and 35), is mounted at the rear of the mold and so as to partake of its oscillatory adjustments. It is carried on supports $L^2$ (Figs. 28, 29 and 30), formed with elongated openings $L^4$ loosely surrounding the shaft $G^4$, and splined at $L^3$ to the arms $G^{20}$ fast thereon. It is also formed with a projection $L^5$ which contacts with an abutment $L^6$ as the mold swings to the ejecting position and serves to shift the plate L and break off the sprue therein. When the mold returns to casting position, a projection $L^7$ contacts with the abutment $L^6$ and restores the plate.

*Ejection.*

As already noted, the ejection of the slug, etc. from the mold slot $G^1$ is effected by the longitudinal movement of the liner $M^1$ connected to the jaw M. The jaw is in the form of a bar mounted to slide endwise in the guide $M^2$ which is fast on the shaft $G^4$ and partakes of its rocking adjustments (Figs. 1, 2, 13, 30, 31, 32, 37, 38, 39, and 40). The bar M is formed with a rack $M^3$ adapted to be engaged by the spring pressed detent $M^4$ on the guide $M^2$, so that it will be held in its set position when the mold is in its upright or casting condition (Fig. 30). When the mold swings down to its horizontal or ejecting position (Figs. 31, 36, 38, 39 and 40) the detent $M^4$ is moved by the abutment $M^5$ to release the rack $M^3$ and the bar M is free to be shifted longitudinally through the guide $M^2$ to secure the ejecting operation.

This movement (to the left in Fig. 36, and to the right in Figs. 38, 39 and 40) is effected by the carriage S which is reciprocated along the slide $S^1$ (Fig. 2) by the link $S^6$, lever $S^7$, and groove cam $S^8$ on the shaft J. The bar M is provided with a projecting arm $M^8$ adapted to be engaged between the spring pressed pawl $S^2$ and the abutment $S^3$ on the carriage S (Figs. 36 and 41). Fig. 38 shows the bar M against the cast line in the mold slot, when the carriage S begins its movement to the right. The pawl $S^2$ passes under the arm $M^8$ which is then engaged by the abutment $S^3$ and the bar proceeds to eject the line (Fig. 39). The carriage S then returns to its original position (Fig. 40) at which point an arm $S^4$ connected to the pawl $S^2$ engages the fixed abutment $S^5$, depressing the pawl and releasing the arm $M^8$. The bar M is then shifted by the connected spring $M^6$ to its setting condition, namely with its finger $M^7$ in contact with the adjusting stop R, as next to be described.

Jaw adjustment.

Normally, the parts are adjusted to produce a line of predetermined length, but in order to adapt the jaw M and the length of the mold slot to lines of greater or diffent extent, when indeterminate numbers of separators are introduced therein, means are provided to vary the setting of the jaw and the connected liner $M^1$ to correspond to the combined thickness of the separators in the line under composition, as best shown in Fig. 36. This is effected by connecting the bar M to the adjusting stop R after the ejecting operation. The bar is formed with a pivotal finger $M^7$, normally out of the path of the stop but adapted to be turned into it (Fig. 37ª) when the bar is in its outermost position (Fig. 40), at which time the connected projection $M^9$ (Fig. 36) encounters the fixed cam $M^{10}$. Simultaneously the arm $M^8$ of the bar M is released from the carriage S, as already described, and the spring $M^6$ shifts the bar longitudinally until the finger $M^7$ is arrested by the stop R (Figs. 37, 41 and 42) irrespective of the length of the previous line, or of the position to which the stop may have been adjusted.

The stop R is mounted on the slide $R^1$ which is normally urged outwardly by the spring $R^2$ (Fig. 36) and is formed at opposite sides with racks $R^3$ and $R^4$ each formed with tooth intervals equal to the thickness of a single separator. The step-by-step feed of the slide $R^1$ and the consequent adjustment of the stop R is effected by a divided escapement comprising the normally disengaged dog $R^5$ coöperating with the rack $R^3$ and the dog $R^6$ normally engaging the rack $R^4$. The dogs are mounted on the slide $R^8$ which is reciprocated so that at each complete movement the slide $R^1$ is permitted to retreat a distance equal to that between two teeth on the rack $R^3$. The slide $R^8$ is connected (Fig. 36) by link $R^9$, arm $R^{10}$, rock shaft $R^{11}$, arm $R^{12}$, link $R^{13}$ and lever $R^{14}$ to the devices $B^2$ for actuating the separator escapement, with the necessary result that every time a separator is introduced into the line the stop R is moved a distance equal to its thickness, and consequently the jaw M and liner $M^1$ will be ultimately set at a point corresponding to the increased length of line due to any number of separators introduced therein.

It will be understood that so far as the setting of the jaw and liner is concerned, the effect will be the same whether the stop R be fully or only partially adjusted before the finger $M^7$ contacts therewith, as in the latter event the jaw will simply move with it during its final adjustment. This enables the operator to proceed with the composition of a second line and the accompanying mold and jaw adjustment during the period when the first line is being cast.

As already indicated, the setting of the jaw and liner is secured when the mold is in its lower or ejecting position (Fig. 31), after which the parts swing upwardly to the casting position. This movement releases the detent $M^4$ from the abutment $M^5$ and it reëngages the rack $M^3$ so that the parts will be securely locked during casting (Fig. 30). Similarly the finger $M^7$ is lifted out of contact with the stop R and as the parts rise it is turned to normal position by the piece $M^{11}$ connected to a crank arm $M^{12}$ integral with the finger (Figs. 36, 37, 37ª and 42), which piece contacts with the bar $M^{13}$ (Figs. 38 and 42).

The slide $R^1$ and stop R are restored to normal position by a second reciprocation of the carriage S which occurs immediately after the mold swings upward; the cam $S^8$ being suitably formed to effect it. It will be noted that at this time the slide is held only by the engagement of the rack $R^4$ and dog $R^6$, and that the latter (Fig. 42) is yieldingly mounted on the slide $R^8$ through the medium of a spring $R^7$, so that the return of the slide is not opposed thereby.

The carriage S is provided (Figs. 37, 41 and 42) with a projection $S^{20}$ on the rod $S^{21}$ yieldingly mounted against the spring $S^{22}$, the said projection being in line with a stud $R^{20}$ connected to the slide $R^1$, so that when the carriage makes its second traverse the slide will be carried with it to normal position. To prevent this engagement during the ejecting traverse of the carriage, the stud $R^{20}$ is adjustably mounted, it being formed on a vertical rod $R^{21}$ movably arranged on the slide and provided with a spring $R^{22}$ which normally holds the rod up and the stud in position to be engaged by the projection $S^{20}$. The ejecting operation, as already explained, occurs after the mold has swung down, at which time the jaw M contacts with the end of the rod $R^{21}$ (dotted lines in Fig. 37) and forces it downward and shifts the stud $R^{20}$ out of the path of the projection $S^{20}$, so that the carriage S may pass it without effect.

In order to insure accuracy in the normal positioning of the adjusting stop R, its slide $R^1$ is formed with a projecting piece $R^{30}$ (Fig. 36) adapted to be arrested by the gage $R^{31}$, which is adjustably mounted on the framework so that it may be closely set in relation to a scale thereon.

Driving means.

Power is imparted to the various automatic devices from the power shaft H which is intermittingly rotated from the band-wheel $H^1$. The two pulleys $A^{23}$ and the pulley $F^{14}$, which are respectively employed for driving the constantly rotating disks $A^{20}$ and $F^{10}$, are mounted on the sleeve $H^2$ connected to the band-wheel. The sleeve $F^{15}$ of the gear $F^9$, which actuates the follower F, is loose on the shaft H but normally connected thereto by the splined clutch member $F^{16}$, so that when the shaft begins its movement the gear will be rotated thereby, its operative connection being subsequently broken and then restored by the cam arm $F^{17}$ and cam $F^{18}$. Motion is imparted to the main or cam shaft J through the large gear $H^4$ thereon which meshes into the pinion $H^3$ on the shaft H, so that when the latter is operated the shaft J will be given a single rotation of sufficient duration to effect its necessary functions through the cams, etc., connected thereto. The means for rotating the shaft H intermittingly from the band-wheel $H^1$ may be of any desired nature, although I have preferably indicated them as substantially similar to those disclosed in my former Letters Patent No. 679,481. These parts comprise generally the clutch member $H^5$, its controlling lever $H^6$, the releasing lever $H^7$ and suitable connections $H^8$ to the handle $H^9$ located at the side of the keyboard, the lever $H^7$ also coöperating with a stop $H^{10}$ on the disk $H^{11}$ fast on the shaft J, as set forth in said patent. After a line has been composed, the operator employs the handle, and through the connections described shifts the releasing lever $H^7$, with the double effect of permitting the clutch $H^5$ to connect the shaft H to the band-wheel $H^1$ and of temporarily moving the lever $H^7$ out of the path of the stop $H^{10}$.

Through the pinion $H^3$ and gear $H^4$ motion is imparted to the shaft J, until at the end of its rotation the stop $H^{10}$ again contacts with the controlling lever $H^7$ and the clutch is disengaged, when the parts operated by the shaft resume their normal position of rest.

Conclusion.

As already stated, I have shown my improvements only in preferred form and as applied to a special form of mechanism, but obviously the parts are susceptible of many alterations and modifications without departure from the scope of my invention.

Having thus described my invention, its construction and mode of operation, what I claim and desire to secure by Letters Patent of the United States, is as follows:

1. In an organized typographical composing and casting machine comprising matrices, the combination of means for composing the matrices in line, means for casting a complete line of type therefrom at one operation, and means coöperating with said parts to adapt them to produce the type line in the form of an integral bar or slug, or of separate and independent sections, as desired.

2. In an organized typographical composing, casting and distributing machine, the combination of a matrix magazine, means for composing the matrices in line, means for casting a line of type therefrom, means coöperating with said parts to effect the casting of the type line in the form of an integral bar or slug, or of separate and independent sections, as desired, and means for returning the matrices after casting to their magazine.

3. In an organized typographical composing and casting machine including composing and casting means, the combination of matrices, justifying spacers and independent separators, and means for manipulating said elements to cause the machine to cast at one operation a line of type in the form of an integral bar or slug, or individual type, or logotypes, as desired.

4. An organized machine for casting at one operation a complete line of type in the form of an integral bar or slug, or of separate and independent sections, as desired, including in combination means for composing matrices in line, casting means to coöperate with the composed line, and coöperative means, adapted to be rendered active or inactive at will, to control the casting of the type line in one form or another.

5. In an organized typographical composing and casting machine comprising matrices the combination of means for composing the matrices in line, casting means including a mold to coöperate with the composed line and to cast therefrom at one operation a complete line of type, and means operative when desired to divide the composed matrix line into groups, and the mold into as many different compartments, so as to produce the type line in the form of separate and independent sections.

6. In a typographical machine comprising matrices, the combination of means for composing the matrices in line, casting means including a mold to coöperate with the composed line and to cast therefrom at one operation a complete line of type, automatic means operative to divide the composed matrix line into groups, and the mold into as many different compartments, and means for rendering said automatic means active or inactive as desired; whereby the type lines may be cast in the form of integral bars or slugs, or of separate and independent sections, at the will of the operator.

7. In an organized typographical composing and casting machine, the combination of means for composing a matrix line, means whereby said line may be constituted in one group or a plurality of groups, as desired, and casting means to coöperate with the composed matrix line and organized to cast therefrom at one operation a complete line of type in the form of an integral bar or slug, or of a plurality of separate and independent sections, according to the constitution of the composed line.

8. In an organized typographical composing and casting machine comprising matrices, the combination with means for composing the matrices in line, and means for casting a line of type therefrom, of means whereby the succeeding type lines may be cast either in the form of integral bars or slugs, or of separate and independent sections, and means for assembling the successive type lines side by side in column.

9. In an organized typographical composing and casting machine comprising matrices, the combination with means for composing the matrices in line, and means for casting a line of type therefrom, of means whereby the succeeding type lines may be cast either in the form of integral bars or slugs, or of separate and independent sections, a galley to receive the cast type lines, and means for delivering said lines to the galley and arranging them side by side therein.

10. In an organized typographical composing and casting machine comprising matrices, the combination with means for composing the matrices in line, and means for casting a line of type therefrom, of means whereby the succeeding type lines may be cast either in the form of integral bars or slugs, or of separate and independent sections, and means for ejecting the type lines from the mold.

11. In a typographical machine comprising matrices, the combination with means for composing the matrices in line, and means for casting a line of type therefrom, of means whereby the succeeding type lines may be cast either in the form of integral bars or slugs, or of separate and independent sections, and an ejector for removing the type lines endwise from the mold.

12. In an organized typographical composing and casting machine comprising matrices, the combination with means for composing the matrices in line, and means for casting a line of type therefrom, the said parts being constructed so as to cast the type line in the form of an integral bar or slug, with means incorporated in the machine and operative at will whereby said parts may be caused to cast the type line in separate and independent sections when desired.

13. In an organized typographical composing and casting machine comprising matrices, the combination with means for composing the matrices in line, and means for casting a line of type therefrom, the said parts being constructed so as to cast the type line in the form of an integral bar or slug, with means incorporated in the machine and operative at will whereby said parts may be caused to cast the type line in the form of individual type or logotypes as desired.

14. In an organized typographical composing and casting machine comprising matrices, the combination with means for composing the matrices in line, casting means including a mold to coöperate with the composed line and to cast therefrom at one operation a complete line of type, independent separators adapted to be introduced into the matrix line to divide it into groups and the mold into as many different compartments, and means for effecting such introduction of the separators when desired.

15. In a typographical machine comprising matrices, the combination of means for composing the matrices in line, casting means including a mold to coöperate with the composed line, independent separators adapted to be introduced into the matrix line to divide it into groups and the mold into as many different compartments, and automatic means for effecting such introduction of the separators during the composition of the matrix line.

16. In a typographical machine comprising matrices, the combination of means for composing the matrices in line, casting means including a mold to coöperate with the composed line, independent separators adapted to be introduced into the matrix line to divide it into groups and the mold into as many different compartments, automatic means for effecting such introduction of the separators during composition, and means for rendering said automatic means active or inactive so as to permit the composition of the matrix line with or without separators as desired.

17. In an organized typographical composing and casting machine comprising matrices and justifying spacers, the combination of means for composing said parts in line, casting means including a mold to coöperate with the composed line and to cast therefrom at one operation a complete line of type, separators having mold dividing portions adapted to be introduced into the composed line after each matrix and spacer or after each spacer alone and means for effecting such introduction of the separators; whereby the machine may be caused to cast the justified type lines in the form of individual type or logotypes, as desired.

18. In a typographical machine comprising matrices and spacers, the combination of means for composing said parts in line, casting means including a mold to coöperate with the composed line, independent separators adapted to be introduced into the line to divide it into groups and the mold into as many different compartments, and automatic means for introducing the separators into the matrix line as each matrix and spacer is introduced or as each spacer alone is introduced, as desired.

19. In a typographical machine comprising matrices and spacers, the combination of means for composing said parts in line, casting means including a mold to coöperate with the composed line, independent separators adapted to be introduced into the line to divide it into groups and the mold into as many different compartments, automatic means for introducing the separators into the line as each matrix and spacer is introduced or as each spacer alone is introduced, as desired, and means for rendering said automatic means active or inactive to permit the composition of the line with or without separators.

20. In an organized typographical composing and casting machine comprising matrices, the combination with means for composing the matrices in line, a keyboard controlling such composition, casting means including a mold to coöperate with the composed line, separators adapted to be introduced into the matrix line during composition to divide it into groups and the mold into as many different compartments, and means actuated from the keyboard for effecting such introduction of the separators.

21. In a typographical machine comprising matrices, the combination of means for composing the matrices in line, a keyboard controlling such composition, casting means including a mold to coöperate with the composed line, separators adapted to be introduced into the matrix line during composition to divide it into groups and the mold into as many different compartments, means for effecting such introduction of the separators, and means for connecting the last-mentioned means to or disconnecting them from the keyboard at will; whereby the matrix line will be composed with or without the separators and consequently the type line cast in the form of an integral bar or slug, or of a plurality of separate and independent sections, according to the absence or presence of the separators in the composed line.

22. In a typographical machine comprising matrices and justifying spacers, the combination of means for composing said parts in line, a keyboard controlling such composition and including a spacer key, casting means including a mold to coöperate with the composed line, separators adapted to be introduced into the matrix line during composition to divide it into groups and the mold into as many different compartments, means effecting such introduction of the separators, and means whereby the last-mentioned means may be connected to the keyboard as a whole or to its spacer key alone, or disconnected entirely from said parts; whereby the separators will be introduced into the matrix line as each individual letter or word group is composed, or not introduced at all, according to the aforesaid connection or disconnection of the keyboard.

23. In a typographical machine equipped with matrices, justifying spacers and separators, the combination of means for composing said parts in line, a casting mold to coöperate with the composed line and adjustable as to length, and means for increasing the length of the mold according to the total thickness of the separators in the composed line.

24. In a typographical machine equipped with matrices, justifying spacers and separators, the combination of means for composing said parts in line, a casting mold to coöperate with the composed line and adjustable as to length, and means actuated as each separator is composed in line for increasing the length of the mold in accordance with the thickness of such separator.

25. In a typographical machine equipped with matrices, justifying spacers and separators, the combination of means for composing said parts in line, a slotted mold to coöperate with the composed line and including a liner forming one end of the mold slot and adjustable longitudinally to vary the length of said slot, and means actuated as each separator is composed in line for adjusting the liner to increase the length of the mold slot in accordance with the thickness of said separator.

26. In a typographical machine equipped with matrices, justifying spacers and separators, the combination of means for composing said parts in line, a casting mold to coöperate with the composed line, a pair of clamping jaws between which the line is confined during casting, and means for altering the distance between the jaws according to the number of separators in the composed line.

27. In a typographical machine equipped with matrices, justifying spacers and separators, the combination of means for composing said parts in line, a casting mold to coöperate with the composed line, a pair of clamping jaws between which the line is confined during casting, and means actuated as each separator is composed in line for increasing the distance between the two jaws in accordance with the thickness of said separator.

28. In a typographical machine equipped with matrices, justifying spacers and separators, the combination of means for composing said parts in line, a casting mold to coöperate with the composed line and adjustable as to length, a pair of line clamping jaws between which the line is confined during casting and adjustable toward and from each other, and means for altering the length of the mold and the distance between the two jaws according to the total thickness of the separators in the composed line.

29. In a typographical machine equipped with matrices, justifying spacers and separators, the combination of means for composing said parts in line, a casting mold to coöperate with the composed line and adjustable as to length, a pair of line clamping jaws between which the line is confined during casting and adjustable toward and from each other, and means actuated as each separator is composed in line for increasing the length of the mold and the distance between the clamping jaws in accordance with the thickness of said separator.

30. In a typographical machine equipped with matrices, justifying spacers and separators, the combination of means for composing said parts in line, a slotted mold to coöperate with the composed line and including a liner forming one end of the mold slot and adjustable longitudinally to vary the length of said slot, a pair of clamping jaws between which the line is confined during casting, one of said jaws being attached to and adjustable with the mold liner, and means actuated as each separator is composed in line for altering the position of the mold liner to vary the adjustment of the mold and of the line clamping jaws in accordance with the thickness of said separator.

31. In a typographical machine equipped with matrices, justifying spacers and separators having mold dividing portions, the combination of means for composing said parts in line, a casting mold, means for presenting the composed line to the mold, and means for separating the side walls of the mold prior to the presentation of the composed line to facilitate the introduction of the dividing portions of the separators.

32. In a typographical machine equipped with matrices, justifying spacers and separators having mold dividing portions, the combination of means for composing said parts in line, a casting mold, means for presenting the composed line to the mold, and means for separating and restoring the side walls of the mold before and after the presentation of the composed line, for the purpose described.

33. In a typographical machine equipped with matrices, justifying spacers and separators having mold dividing portions, the combination of means for composing said parts in line, a casting mold, means for presenting the composed line to the mold, means for subsequently withdrawing the separators from the mold, and means for separating and restoring the side walls of the mold before and after the presentation of the composed line and before and after the withdrawal of the separators, respectively.

34. In a typographical machine equipped with matrices, justifying spacers and separators having mold dividing portions, the combination of means for composing said parts in line, a casting mold, and means for transferring the composed line thereto, said mold at the time of transfer being open at one end and arranged in position to receive the dividing portions of the separators.

35. In a typographical machine equipped with matrices, justifying spacers and separators having mold dividing portions, the combination of means for composing said parts in line, a casting mold, means for transferring the composed line thereto, said mold at the time of transfer being open at one end and arranged in position to receive the dividing portions of the separators, and a liner to close the open end of the mold after the composed line is presented thereto.

36. In a typographical machine equipped with matrices, justifying spacers and separators having mold dividing portions, the combination of means for composing said parts in line, a casting mold, means for transferring the composed line thereto, said mold at the time of transfer being open at one end and arranged in position to receive the dividing portions of the separators, a liner to close the open end of the mold after the composed line is presented thereto, and a line clamping jaw connected to said liner.

37. In a typographical machine equipped with matrices, justifying spacers and expansible separators having mold dividing portions, the combination of means for composing said parts in line, a casting mold, means for presenting the composed line to the mold, and means for expanding and contracting said mold dividing portions before and after casting, respectively.

38. In a typographical machine equipped with matrices, justifying spacers and separators having mold dividing portions, the combination of means for composing said parts in line, a casting mold, means for presenting the composed line to the mold, and means for subsequently withdrawing the separators from the composed line and the mold while maintaining the other elements of the line in casting relation to the mold.

39. In a typographical machine equipped with matrices, justifying spacers and separators having mold dividing portions, the combination of means for composing said parts in line, a casting mold, means for presenting the composed line to the mold, and means for subsequently withdrawing the separators from the composed line and the mold while maintaining the other elements of the line in casting relation to the mold, the said separators being constructed to collapse as they are so withdrawn.

40. In a typographical machine equipped with matrices, justifying spacers and separators having mold dividing portions, the combination of means for composing said parts in line, a casting mold having a sprue plate at the back thereof, means for presenting the composed line to the front of the mold, and means for subsequently withdrawing the separators from the composed line and the mold while maintaining the other elements of the line in casting relation to the mold.

41. In a typographical machine equipped with matrices, justifying spacers and separators having mold dividing portions, the combination of means for composing said parts in line, a casting mold, means for presenting the composed line to the mold, and means associated directly with the separators for insuring their proper location in the mold.

42. In a typographical machine equipped with matrices, justifying spacers and separators having mold dividing portions, the combination of means for composing said parts in line, a casting mold, means for presenting the composed line to the mold, means for subsequently withdrawing the separators from the mold, and means associated directly with the separators for maintaining them in right-angular relation to the mold.

43. In a typographical machine equipped with matrices, justifying spacers and separators having mold dividing portions, the combination of means for composing said parts in line, a casting mold, means for presenting the composed line to the mold, and means for subsequently withdrawing the separators from the line and the mold and returning them to their place of storage, and other means for thereafter returning the matrices and spacers to their places of storage.

44. In a typographical machine equipped with matrices, justifying spacers and separators having mold dividing portions, the combination of means for composing said parts in line, including guides upon which the matrices and spacers are supported and an independent guide upon which the separators are supported, a casting mold past which the said guides are extended, and means for shifting the composed line along the several guides to present it to the mold for the casting operation.

45. In a typographical machine equipped with matrices, justifying spacers and separators having mold dividing portions, the combination of means for composing said parts in line, including guides upon which the matrices and spacers are supported and an independent guide upon which the separators are supported, a casting mold past which the said guides are extended, and means for shifting the composed line along the several guides to present it to the mold for the casting operation, the section of the separator guide opposite the mold being movable toward and from the same, for the purpose described.

46. In a typographical machine equipped with matrices, justifying spacers and separators having mold dividing portions, the combination of means for composing said parts in line, including guides upon which the matrices and spacers are supported and an independent guide upon which the separators are supported, a casting mold past which the said guides are extended, means for shifting the composed line along the several guides to present it to the mold after the casting operation, the section of the separator guide opposite the mold being movable away from the same after casting to withdraw the separators from the line and the mold, a further guide registering with said movable section in its withdrawn position and leading back to the place of storage of the separators, and means for pushing the separators onto the latter guide at the proper time.

47. In a typographical machine equipped with matrices, justifying spacers and separators having mold dividing portions, the combination of means for composing said parts in line, a casting mold, means for presenting the composed line thereto, and means for withdrawing the separators in series from the composed line and the mold after casting and returning them to their place of storage.

48 In a typographical machine equipped with matrices, justifying spacers, and separators having mold dividing portions, the combination of means for composing said parts in line, a casting mold, means for presenting the composed line to the mold, means for withdrawing the separators from the mold after casting, means for subsequently rocking the mold downwardly from its casting position, and means for thereafter ejecting the cast type line from the mold.

49. In an organized machine for producing a complete line of type in the form of an integral bar or slug, or of separate and independent sections, as desired, the combination of means for composing matrices in line in one condition or another according to the form of type line desired, casting means alterable to conform to the condition of the composed line so as to cast the type line in the desired form, and selectively controlled elements to determine the condition of the composed matrix line and the casting means.

50. In an organized typographical composing and casting machine, the combination of means for composing matrices in line, casting means, and devices for altering the condition of successive matrix lines and of the casting means to adapt said parts to produce the type line in the form of an integral bar or slug, or of separate and independent sections, as desired.

51. An organized machine for casting at one operation a complete line of type in the form of an integral bar or slug, or of separate and independent sections, as desired, including in combination mechanism for composing matrices in line and for casting a type line therefrom in the form of an integral bar or slug, and coöperative means active at will to effect the casting of the type line in the form of separate and independent sections.

52. In a typographical machine, the combination of a slotted mold wherein the type lines are cast and including a part constituting one of the walls of the mold slot and movable to eject the type lines therefrom, means for rocking the mold to and from casting position about an axis extending longitudinally of the mold, and means for effecting the movement of the ejecting part of the mold when the latter is out of casting position.

53. In a typographical machine, the combination of a slotted mold wherein the type lines are cast and including a liner constituting an end wall of the mold slot and movable to eject the type lines therefrom, means for rocking the mold to and from casting position about an axis extending longitudinally of the mold, and means for effecting the ejecting movement of the liner when the mold is out of casting position.

54. A slotted mold for typographical machines comprising side walls and interposed liners forming the end walls thereof, one of the liners being movable out of the mold in the plane of its slot to open one end thereof and the other liner being movable longitudinally of the mold to eject the cast type lines from its open end.

55. In a typographical machine, the combination of a slotted mold comprising side walls and interposed liners forming the end walls thereof, one of the liners being movable out of the mold in the plane of its slot to open one end thereof and the other liner being movable longitudinally of the mold to eject the cast type lines from its open end, and means for effecting such movements of the liners after the casting operation.

56. In a typographical machine, the combination of a mold comprising side walls and intermediate liners forming the end walls thereof, means for rocking the mold to and from casting position about an axis extending longitudinally of the mold, means for moving one of the liners out of the mold when the latter is in casting position, and means for moving the other liner longitudinally of the mold when the latter is out of casting position to eject the cast type lines therefrom.

57. In a typographical machine, the combination of a casting mold comprising side walls and intermediate liners forming the end walls thereof, one of said liners being supported independently of the mold and pivotally mounted so as to be swung out of the same, and the other liner being carried by the mold and movable longitudinally thereof to eject the cast type lines therefrom, and means for effecting the movements of the liners at predetermined periods.

58. In a typographical machine, the combination of a mold comprising side walls and intermediate liners forming the end walls thereof, means for moving the mold to and from casting position, means for moving one of the liners out of the mold when the latter is in casting position, and means for moving the other liner longitudinally of the mold when the latter is out of casting position, for the purpose described.

59. In a typographical machine, the combination of a mold comprising side walls and intermediate liners forming the end walls thereof, means for moving the mold to and from casting position, means for moving one of the liners out of the mold when the latter is in casting position, means for moving the other liner longitudinally of the mold when the latter is out of casting position, and means for separating the side walls of the mold in each of its positions before the movements of the liners take place.

60. In a typographical machine, the combination of a slotted mold comprising side walls and interposed liners forming the end walls thereof, one of the liners being movable out of the mold in the plane of the slot to open one end thereof and the other liner being movable longitudinally of the mold to eject the cast type lines from its open end, and means for separating the side walls of the mold before the movements of the liners take place.

61. In a typographical machine, the combination of a mold comprising side walls and intermediate liners forming the end walls thereof, means for rocking the mold to and from casting position about an axis extending longitudinally of the mold, means for moving one of the liners out of the mold when the latter is in casting position, means for moving the other liner longitudinally of the mold when the latter is out of casting position to eject the cast type lines therefrom, and means for separating the side walls of the mold in each of its positions and before the movements of the liners take place.

62. In a typographical machine, the combination of a mold arranged to be moved to and from casting position and including side walls, and means for separating the side walls of the mold when the latter is in casting position.

63. In a typographical machine, the combination of a mold arranged to be moved to and from casting position and including side walls, and means for separating the side walls of the mold in each of its two different positions.

64. In a typographical machine, the combination of a mold arranged to be moved to and from casting position and including side walls, and means for separating and restoring the side walls of the mold when the latter is in casting position before the casting operation takes place.

65. In a typographical machine, the combination of a mold arranged to be moved to and from casting position and including side walls, and means for separating and restoring the side walls of the mold when the latter is in casting position after the casting operation takes place.

66. In a typographical machine, the combination of a mold arranged to be moved to and from casting position and including side walls, and means for separating and restoring the side walls of the mold when the latter is in casting position both before and after the casting operation takes place.

67. In a typographical machine, the combination of a mold arranged to be moved to and from casting position and including side walls, and means for separating and restoring the side walls of the mold when the latter is in casting position after the casting operation takes place and for again separating the side walls of the mold when it is out of casting position.

68. In a typographical machine, the combination of a mold arranged to be moved to and from casting position and including a liner forming one of the end walls, and means for moving the liner into and out of the mold when the latter is at rest in casting position and before and after casting, respectively.

69. In a typographical machine, the combination of a matrix line, a mold coöperating therewith and arranged to be swung outwardly therefrom, and means for depressing the mold slightly prior to its outward movement.

70. In a typographical machine, the combination of a mold arranged to be moved to and from casting position and adjustable as to length to accommodate matrix lines of different lengths, and automatic means for effecting the required adjustment of the mold when the latter is at rest out of casting position.

71. In a typographical machine, the combination of composing means, a keyboard associated therewith, a mold arranged to be moved to and from casting position and adjustable as to length, and means actuated from the keyboard for effecting the adjustment of the mold when out of casting position in accordance with the composed line.

72. In a typographical machine, the combination of a slotted mold arranged to be moved to and from casting position and including an adjustable part carried thereby to vary the length of the mold slot to correspond with matrix lines of different lengths, and automatic means for effecting the required adjustment of said part when the mold is at rest out of casting position.

73. In a typographical machine, the combination of matrix composing means, a keyboard associated therewith, a slotted mold arranged to be moved to and from casting position and including an adjustable part carried thereby to vary the length of the mold slot, and means actuated from the keyboard for effecting the adjustment of said part when the mold is out of casting position in accordance with the composed line.

74. In a typographical machine, the combination of matrix composing means, a keyboard associated therewith, a slotted mold comprising side walls and liners constituting the end walls thereof, one of said liners being permanently located between the side walls of the mold and adjustable longitudinally thereof to vary the length of the slot, and means actuated directly by the keyboard for effecting the adjustment of the liner in accordance with the composed line.

75. In a typographical machine, the combination of matrix composing means, a keyboard associated therewith, a slotted mold comprising side walls and liners constituting the end walls thereof, one of said liners being permanently located between the side walls of the mold and adjustable longitudinally thereof to vary the length of the slot, and means actuated by the key board for effecting the adjustment of the liner in accordance with the composed line, the said means including a ratchet bar shiftable longitudinally and provided with an abutment to engage the liner.

76. In a typographical machine, the combination of a slotted mold arranged to be moved to and from casting position, comprising side walls and intermediate liners forming the end walls thereof, one of said liners being adjustable longitudinally to vary the length of the slot, and automatic means for effecting the adjustment of the liner, said means including a ratchet bar mounted independently of the mold and provided with an abutment arranged in position to be engaged by the liner when the mold is out of casting position.

77. In a typographical machine, the combination of a slotted mold arranged to be moved to and from casting position and comprising side walls and intermediate liners forming the ends walls thereof, one of said liners being movable longitudinally of the mold to vary the length of the slot and also to eject the cast type lines therefrom, means for holding the liner in its adjusted position when the mold is in casting position, and means for disengaging said holding means when the mold is out of casting position to permit the ejecting and adjusting movements of the liner.

78. In a typographical machine, the combination of a slotted mold arranged to be moved to and from casting position and comprising side walls and intermediate liners forming the end walls thereof, one of said liners being movable longitudinally of the mold to vary the length of the mold slot and also to eject the cast type lines therefrom, means actuated when the mold is out of casting position to effect the ejecting movement of the liner and to restore it to its outermost position and then to release it, a spring acting when the liner is released to shift it inwardly, an abutment to engage the liner and arrest its inward movement and thus to control the length of the slot, and a detent coöperating with the liner to hold it in its arrested position to preserve the adjustment of the mold when the latter is moved to casting position.

79. In a typographical machine, the combination of a slotted mold arranged to be moved to and from casting position and comprising side walls and intermediate liners forming the ends walls thereof, one of said liners being movable longitudinally of the mold to vary the length of the mold slot and also to eject the cast type lines therefrom, means actuated when the mold is out of casting position to effect the ejecting movement of the liner and to restore it to its outermost position and then to release it, a spring acting when the liner is released to shift it inwardly, an automatically operated ratchet bar provided with an abutment to engage the liner and arrest its inward movement and thus to control the length of the slot, and a detent coöperating with the liner to hold it in its arrested position to preserve the adjustment of the mold when the latter is moved to casting position.

80. In a typographical machine, the combination of a slotted mold arranged to be moved to and from casting position and comprising side walls and intermediate liners forming the end walls thereof, one of said liners being movable longitudinally of the mold to vary the length of the slot and also to eject the cast type lines therefrom, means actuated when the mold is out of casting position to effect the ejecting movement of the liner and to restore it to its outermost position and then to release it, a spring acting when the liner is released to shift it inwardly, an abutment to engage the liner and arrest its inward movement and thus to control the length of the slot, a detent coöperating with the liner to hold it in its arrested position to preserve the adjustment of the mold when the latter is moved to casting position, and means actuated when the mold is moved from its casting position to disengage the holding detent from the liner and to free it and permit its ejecting movement.

81. In a typographical machine, the combination of a slotted casting mold comprising side walls and interposed liners forming the end walls thereof, one of said liners being permanently located in the mold and the other being movable into and out of the same in the plane of the mold slot, and means for effecting such movement of the liner at predetermined periods.

82. In a typographical machine, the combination of a slotted casting mold comprising side walls and interposed liners forming the end walls thereof, one of said liners being carried by the mold, and means for supporting the other liner independently of the mold and for moving it into and out of the same in the plane of the mold slot.

83. In a typographical machine, the combination of a casting mold arranged to be swung to and from casting position about an axis extending longitudinally of the mold, and a line clamping jaw carried by and movable with the mold.

84. In a typographical machine, the combination of a mold arranged to be swung to and from casting position, a pair of line clamping jaws, one carried by and movable with the mold and the other mounted independently thereof and movable into and out of active position in proper synchronism with the movements of the mold, and a mold liner connected to and movable with the latter jaw.

85. In a typographical machine, the combination of line composing means, a casting mold, means for transferring the composed line to the mold, a pair of clamping jaws to engage the line at opposite ends when presented to the mold, one of said jaws at the time of transfer being arranged in the path of movement of the line to engage the same as it is presented to the mold, and the other jaw being arranged out of the path of movement of the line to permit its presentation to the mold and then movable to active position to engage the terminal end of the line, and a mold liner connected to and movable with the latter jaw.

86. In a typographical machine, the combination of a casting mold comprising side walls and liners forming the end walls thereof, one of said liners being supported by the mold and the other supported independently thereof and movable into and out of the same, and a line clamping jaw connected to the last mentioned liner.

87. In a typographical machine, the combination of a casting mold comprising side walls and liners forming the end walls thereof, one of said liners being supported by the mold and the other supported independently thereof and movable into and out of the same, and a clamping jaw connected to each of the liners.

88. In a typographical machine, the combination of a mold arranged to be moved to and from casting position and adjustable as to length to correspond to matrix lines of different lengths, a line clamping jaw carried by the mold and correspondingly adjustable to different operative positions thereon, and automatic means for effecting both such adjustments when the mold is at rest out of casting position.

89. In a typographical machine, the combination of composing means, a keyboard associated therewith, a mold arranged to be moved to and from casting position and adjustable as to length, a line clamping jaw carried by the mold and adjustable to different operative positions thereon, and means actuated from the keyboard for effecting both such adjustments when the mold is out of casting position in accordance with the composed line.

90. In a typographical machine, the combination of a slotted mold arranged to be moved to and from casting position and including an adjustable part carried thereby to vary the length of the mold slot to correspond to matrix lines of different lengths, a line clamping jaw attached to such mold part so as to be adjustable therewith, and automatic means for effecting the required adjustment of the mold part when the mold is at rest out of casting position.

91. In a typographical machine, the combination of composing means, a keyboard associated therewith, a slotted mold comprising side walls and a liner permanently located therebetween and adjustable longitudinally thereof to vary the length of the mold slot, a line clamping jaw connected to said liner so as to be adjustable therewith, and means actuated by the keyboard for effecting the adjustment of the liner in accordance with the composed line.

92. A structure as specified in claim 76 characterized by the fact that the longitudinally movable liner therein referred to is attached to a line clamping jaw, for the purpose described.

93. In a typographical machine equipped with matrices, expansible justifying spacers, and independent separators having mold dividing tongues projecting therefrom, the combination of means for composing said parts in line with or without the separators, and casting means including a mold to coöperate with the composed line, the said separators being formed with laterally extended base portions, for the purpose described.

94. In a typographical machine equipped with matrices, expansible justifying spacers, and independent separators having mold dividing tongues projecting therefrom, the combination of means for composing said parts in line with or without the separators, and casting means including a mold to coöperate with the composed line, the said separators being formed at their base portions with laterally extended wings, for the purpose described.

95. In a typograhpical machine equipped with matrices, expansible justifying spacers, and independent separators having mold dividing tongues projecting therefrom, the combination of means for composing said parts in line with or without the separators, and casting means including a mold to coöperate with the composed line, the said separators being formed at their base portions with wings projecting in opposite directions from their upper and lower edges.

96. In a typographical machine equipped with circulating matrices, justifying spacers, and separators having mold dividing tongues projecting therefrom, the combination of means for composing said parts in line, and casting means including a mold to coöperate with the composed line, the said separators being provided with upstanding hook-shaped members to support them during their travel through the machine.

97. In a typographical machine equipped with matrices, expansible justifying spacers, and independent separators having mold dividing tongues projecting therefrom, the combination of means for composing said parts in line with or without the separators, and casting means including a mold to coöperate with the composed line, the said separators being constructed in relatively movable wedge-shaped sections to allow their projecting tongues to be expanded and contracted, in the manner and for the purpose described.

98. In a typographical machine equipped with matrices, expansible justifying spacers, and independent separators having mold dividing tongues projecting therefrom, the combination of means for composing said parts in line with or without the separators, and casting means including a mold to coöperate with the composed line, the said separators being formed in relatively movable wedge-shaped sections to allow them to be expanded and contracted, for the purpose described.

99. In a typographical casting machine equipped with matrices, justifying spacers and separators formed with projecting tongues to enter the mold, as well as the escapements therefor, the combination of means for operating the respective escapements and connections to actuate the separator escapements by the other escapement operating means, when desired.

100. In a typographical casting machine equipped with matrices and justifying spacers, as well as the escapements and operating means therefor, the combination of separators formed with projecting tongues to enter the mold, escapement devices therefor, and means whereby the separator escapements may be actuated by the operation of the first mentioned escapement operating means.

101. In a typographical casting machine equipped with matrices and justifying spacers, as well as the escapements and operating means therefor, the combination of separators formed with projecting tongues to enter the mold, an independent magazine and escapements therefor, and means whereby the operation of the first mentioned escapements will effect the operation of the separator escapements, when desired.

102. In a typographical machine comprising matrices and releasing devices therefor, the combination of casting mechanism, a guide along which the matrices are transferred to the casting mechanism, and an interposed rotating disk which receives the matrices when released and delivers them to the guide.

103. In a typographical machine comprising plural letter matrices, the combination of casting mechanism, supports for holding the matrices at different levels in relation thereto, and a rotating disk to receive the matrices from the supports and restore them to a common level.

104. In a typographical machine comprising suspended plural letter matrices and a place of storage therefor, the combination of casting mechanism, supports for holding the matrices at different levels in relation thereto, means for restoring the matrices to a common level after casting, a single guide to receive the leveled matrices, and means to convey them along it to their place of storage.

105. In a typographical machine equipped with matrices, justifying spacers and separators, the combination of means for composing the matrices and spacers in line with or without the separators, a casting mold to coöperate with the composed line and adjustable as to length to correspond with the length of said line, and a plurality of metal injecting devices, one or more of which may be brought into action according to the length of line to be cast.

106. In a typographical machine equipped with matrices, justifying spacers and separators, the combination of means for composing the matrices and spacers in line with or without the separators, a casting mold to coöperate with the composed line and adjustable as to length to correspond with the length of said line, a melting pot to coöperate with the mold, and a plurality of metal injecting devices located within the pot, one or more of which may be brought into action according to the length of line to be cast.

107. In a typographical composing, casting and distributing machine equipped with plural letter-matrices of the suspended variety, the combination of a plurality of superposed supports extending from composing to casting position, a guide extending from casting to distributing position, means for carrying the composed matrices along the supports and guide, and a rotating disk arranged between said supports and guide and acting to restore the matrices to a common level as they pass from one to the other.

108. In a typographical composing, casting and distributing machine equipped with plural letter-matrices of the suspended variety, the combination of two tiers of superposed supports extending from composing to casting position, a guide extending from casting to distributing position, means for carrying the composed matrices along the supports and guide, and a pair of rotating disks arranged between said supports and guide and acting to restore the matrices to a common level as they pass from one to the other.

109. In a typographical composing, casting and distributing machine equipped with plural letter-matrices of the suspended variety, the combination of a plurality of superposed supports extending from composing to casting position, a guide extending from casting to distributing position, means for carrying the composed matrices along the supports and guide, and means to direct the matrices from the various supports onto the common guide during their passage from one to the other.

110. In a typographical machine equipped with matrices, each formed with a supporting hook and a distributing recess, the combination of a series of storage wires from which the matrices are suspended by their supporting hooks, means for distributing the matrices onto one or another of the storage wires according to form, and a single guide for delivering the matrices to the distributing means and from which the matrices are suspended by their distributing recesses.

111. In a typographical machine equipped with matrices, each formed with a supporting hook and a distributing recess, the combination of a series of storage wires from which the matrices are suspended by their supporting hooks, and a distributing rail overlying the storage wires and from which the matrices are suspended by their distributing recesses, the said rail and recesses being of graduated widths to effect the proper distribution of matrices onto the storage wires.

112. In a typographical composing, casting and distributing machine equipped with matrices, each formed with a supporting hook and a distributing recess, the combination of a plurality of superposed supports extending from composing to casting position and from which the matrices are suspended by their supporting hooks, a guide extending from casting to distributing position and from which the matrices are suspended by their distributing recesses, means for carrying the matrices along the supports and guide, and means for directing the matrices from the various supports onto the guide during their passage from one to the other.

113. In a typographical machine equipped with plural letter-matrices, the combination of a series of wires whereon the matrices are suspended and held in storage, means for releasing the matrices from their storage wires, a rotating disk onto which the released matrices drop, a series of switches for directing the individual matrices from the rotating disk at different selected heights, and a series of superposed supports to receive the matrices from the switches and maintain them in their selected positions.

114. In a typographical machine equipped with plural letter-matrices, the combination of a series of wires whereon the matrices are suspended and held in storage, keyboard devices for releasing the matrices from their storage wires, a rotating disk onto which the released matrices drop, a series of switches controlled by the keyboard devices for directing the individual matrices from the rotating disk at different selected heights, and a series of superposed supports to receive the matrices from the switches and maintain them in their selected positions.

115. In a typographical casting machine, the combination of a mold for casting at one operation a complete line of type in the form of a plurality of separate and independent sections, and an ejector for removing the cast type line endwise from the mold and serving by such action to compact said line by bringing its sections into contacting relation with each other.

116. In a typographical casting machine, the combination of a mold for casting at one operation a complete line of type in the form of a plurality of separate and independent sections, an ejector for removing the cast type line endwise from the mold, and a galley arranged to receive the type line as it is ejected from the mold.

117. In a typographical composing and casting machine, the combination of means for composing the matrices in line, an adjustable slotted mold for casting a complete line of type from the composed matrix line at one operation, and automatic means for varying the length of the mold slot to correspond with the length of the composed matrix line.

118. In a typographical composing and casting machine, the combination of means for composing the matrices in line, a keyboard associated therewith, a casting mold adjustable as to length to correspond with matrix lines of different lengths, and means actuated from the keyboard for effecting the required adjustment of the mold during the composition of the matrix line.

In testimony whereof, I have affixed my signature hereto.

JOHN RAPHAEL ROGERS.